US012771846B2

(12) United States Patent
Kang et al.

(10) Patent No.: US 12,771,846 B2
(45) Date of Patent: *Oct. 20, 2026

(54) VIDEO ENCODING AND DECODING USING DIFFERENTIAL MODULATION

(71) Applicants: HYUNDAI MOTOR COMPANY, Seoul (KR); KIA CORPORATION, Seoul (KR); EWHA UNIVERSITY-INDUSTRY COLLABORATION FOUNDATION, Seoul (KR)

(72) Inventors: Je Won Kang, Seoul (KR); Seung Wook Park, Yongin-si (KR); Wha Pyeong Lim, Hwaseong-si (KR)

(73) Assignees: HYUNDAI MOTOR COMPANY, Seoul (KR); KIA CORPORATION, Seoul (KR); EWHA UNIVERSITY—INDUSTRY COLLABORATION FOUNDATION, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 19/056,088

(22) Filed: Feb. 18, 2025

(65) Prior Publication Data

US 2025/0193403 A1 Jun. 12, 2025

Related U.S. Application Data

(63) Continuation of application No. 17/826,302, filed on May 27, 2022, now Pat. No. 12,262,017, which is a (Continued)

(30) Foreign Application Priority Data

Dec. 2, 2019 (KR) ........................ 10-2019-0158563
Dec. 2, 2020 (KR) ........................ 10-2020-0166249

(51) Int. Cl.
*H04N 19/132* (2014.01)
*H04N 19/105* (2014.01)
(Continued)

(52) U.S. Cl.
CPC ......... *H04N 19/132* (2014.11); *H04N 19/105* (2014.11); *H04N 19/159* (2014.11);
(Continued)

(58) Field of Classification Search
None
See application file for complete search history.

(56) References Cited

U.S. PATENT DOCUMENTS 8,761,531 B2 6/2014 Goma
9,877,035 B2 1/2018 Zou et al.
(Continued)

FOREIGN PATENT DOCUMENTS

KR 20120030590 A 3/2012
KR 20160135756 A 11/2016

OTHER PUBLICATIONS

Bross, Benjamin et al.; "Versatile Video Coding (Draft 7)"; Joint Video Experts Team (JVET) of ITU-T SG 16 WP 3 and ISO/IEC JTC 1/SC 29/WG 11; 16th Meeting: Geneva, CH, Oct. 1-11, 2019 (490 pages). (Year: 2019).*
(Continued)

*Primary Examiner* — Stuart D Bennett
(74) *Attorney, Agent, or Firm* — Lempia Summerfield Katz LLC

(57) ABSTRACT

Disclosed is a video encoding and decoding technology using a differential modulation technique for a residual signal in order to enhance compression performance in a transform skip mode. The differential modulation technique is applicable to both luma and chroma components as long
(Continued)

as the chroma format is not monochrome (i.e. as long as chroma_format_idc=0 is not true).

11 Claims, 9 Drawing Sheets

Related U.S. Application Data continuation of application No. PCT/KR2020/017428, filed on Dec. 2, 2020.

(51) Int. Cl.
*H04N 19/159* (2014.01)
*H04N 19/176* (2014.01)
*H04N 19/186* (2014.01)
*H04N 19/46* (2014.01)
*H04N 19/70* (2014.01)

(52) U.S. Cl.
CPC ......... *H04N 19/176* (2014.11); *H04N 19/186* (2014.11); *H04N 19/46* (2014.11); *H04N 19/70* (2014.11)

(56) References Cited

U.S. PATENT DOCUMENTS

| | | | | |
|---|---|---|---|---|
| 2011/0007979 | A1 | 1/2011 | Goma | |
| 2015/0264376 | A1 | 9/2015 | Zou et al. | |
| 2021/0120272 | A1 | 4/2021 | Auyeung | |
| 2022/0141465 | A1* | 5/2022 | Ko | H04N 19/119 375/240.02 |

OTHER PUBLICATIONS

Benjamin Bross, Versatile Video Coding (Draft 7), JVET-P2001-vE. Joint Video Experts Team (JVET) of ITU-T SG 16 WP 3 and ISO/IEC JTC 1/SC 29/WG 11 16th Meeting: Geneva, CH. Oct. 2019. 491pp.

Bross, Benjamin et al.; "Versatile Video Coding (Draft 7)"; Joint Video Experts Team (JVET) of ITU-T SG 16 WP 3 and ISO/IEC JTC 1/SC 29/WG 11; 16th Meeting: Geneva, CH, Oct. 1-11, 2019 (490 pages).

Chen, Jianle et al. "Algorithm description for Versatile Video Coding and Test Model 7 (VTM 7)"; Joint Video Experts Team (JVET) of ITU-T SG 16 WP 3 and ISO/IEC JTC 1/SC 29/WG 11; 16th Meeting: Geneva, CH, Oct. 1-11, 2019 (91 pages).

Clare, Gordon et al. "CE8-related: BDPCM for chroma"; Joint Video Experts Team (JVET) of ITU-T SG 16 WP 3 and ISO/IEC JTC 1/SC 29/WG 11 15th Meeting: Gothenburg, SE, Jul. 3-12, 2019 (7 pages).

European Search Report in corresponding European app No. EP 20896583.0; Nov. 28, 2023; 11 pp.

Jianle Chen et al., Algorithm description for Versatile Video Coding and Test Model 7 (VTM 7), JVET-P2002-v1. Joint Video Experts Team (JVET) of ITU-T SG 16 WP 3 and ISO/IEC JTC 1/SC 29/WG 11 16th Meeting: Geneva, CH. Oct. 2019. 89pp.

Jin Heo et al., Non-CE3 : Cleanup of intra reference sample filter selection, JVET-P0550-v3. Joint Video Experts Team (JVET) of ITU-T SG 16 WP 3 and ISO/IEC JTC 1/SC 29/WG 11 16th Meeting: Geneva, CH. Oct. 2019. 4pp.

Kyohei Unno et al., Alternative block size conditions for BDPCM, JVET-R0219. Joint Video Experts Team (JVET) of ITU-T SG 16 WP 3 and ISO/IEC JTC 1/SC 29/WG 11 18th Meeting: by teleconference. Apr. 2020. 6pp.

Office Action cited in Chinese patent application No. 202080076349.7; Dec. 8, 2023; 7 pp.

Sunmi Yoo et al., CE8-related : Improvements on BDPCM, JVET-O0205-v2. Joint Video Experts Team (JVET) of ITU-T SG 16 WP 3 and ISO/IEC JTC 1/SC 29/WG 11 15th Meeting: Gothenburg, SE. Jul. 2019. 6pp.

Wenting Cai et al., Cleanup of chroma BDPCM constraint, JVET-Q0361. Joint Video Experts Team (JVET) of ITU-T SG 16 WP 3 and ISO/IEC JTC 1/SC 29/WG 11 17th Meeting: Brussels, BE. Jan. 2020. 3pp.

Bross, Benjamin et al.; "Versatile Video Coding (Draft 7)"; JVET-P2001-v9. Joint Video Experts Team (JVET) of ITU-T SG 16 WP 3 and ISO/IEC JTC 1/SC 29/WG 11; 16th Meeting: Geneva, CH, Oct. 1-11, 2019 (200 pages).

Office action cited in European application No. 20896583.0; Jun. 23, 2026; 8 pp.

* cited by examiner

VIDEO ENCODING AND DECODING USING DIFFERENTIAL MODULATION

CROSS-REFERENCE TO RELATED APPLICATIONS

This application is a continuation of non-provisional U.S. patent application Ser. No. 17/826,302, filed on May 27, 2022, which was the continuation of International Application No. PCT/KR2020/017428, filed on Dec. 2, 2020, which claims priority to Korean Patent Application No. 10-2019-0158563, filed on Dec. 2, 2019, and Korean Patent Application No. 10-2020-0166249, filed on Dec. 2, 2020, the entire contents of each of which are incorporated herein by reference.

TECHNICAL FIELD

The present disclosure relates to video encoding and decoding. More particularly, the present disclosure relates to video encoding and decoding using a differential modulation technique performed in a transfer skip mode.

BACKGROUND

The statements in this section merely provide background information related to the present disclosure and may not constitute prior art.

Since the volume of video data is larger than that of voice data or still image data, storing or transmitting video data without processing for compression requires a lot of hardware resources including memory.

Accordingly, when video data is stored or transmitted, the video data is generally compressed using an encoder so as to be stored or transmitted. Then, a decoder receives the compressed video data, and the decoder decompresses and reproduces the video data. Compression techniques for such video include H.264/AVC and High Efficiency Video Coding (HEVC), which improves coding efficiency over H.264/AVC by about 40%.

We have discovered that because the size and resolution and frame rate of pictures constituting a video are increasing more and more, and thus the amount of data to be encoded is also increasing, it is desired to develop a new compression technology that has better encoding efficiency and greatly improves picture quality.

SUMMARY

The present disclosure relates to a video encoding and decoding technology using a differential modulation technique for residual signals in order to improve compression performance in a transform skip mode.

An aspect of the present disclosure provides a method for decoding a bitstream encoded from a video sequence including a plurality of pictures. The method comprises: decoding, from a sequence parameter set of the bitstream, information on a chroma sampling format and high level syntax elements related to differential modulation for residual signals. In particular, the high level syntax elements comprise: a control flag indicating whether the differential modulation is permitted for the residual signals of the video sequence, and information on a maximum block size for which the differential modulation is permitted. The method further comprises decoding a first chroma syntax element indicating whether the differential modulation has been applied to a chroma block corresponding to a first block to be currently decoded, when the first block satisfies conditions defined by the information on the chroma sampling format and the high level syntax elements. The method further comprises decoding a second chroma syntax element indicating a differential modulation direction applied to the chroma block in response to the first chroma syntax element indicating that the differential modulation has been applied to the chroma block. The method further comprises determining a differential-modulated residual block for the chroma block from the bitstream. The method further comprises determining quantized residual values by differential-demodulating the differential-modulated residual block in the differential modulation direction indicated by the second chroma syntax element. The method further comprises inversely quantizing the quantized residual values for the chroma block. The method further comprises generating predicted values for the chroma block. The method further comprises reconstructing the chroma block corresponding to the first block based on the inversely quantized residual values and the predicted values.

The conditions defined by the information on the chroma sampling format and the high level syntax elements are satisfied when (1) the control flag indicates that the differential modulation is permitted for the video sequence, (2) a value obtained by dividing a width of the first block by a horizontal scaling factor determined by the chroma sampling format is smaller than or equal to the maximum block size, and (3) a value obtained by dividing a height of the first block by a vertical scaling factor determined by the chroma sampling format is smaller than or equal to the maximum block size.

An aspect of the present disclosure provides an apparatus for decoding a video sequence composed of a plurality of pictures. The apparatus comprises means for decoding, from a sequence parameter set of the bitstream, information on a chroma sampling format and high level syntax elements related to differential modulation for residual signals. Herein, the high level syntax elements comprise a control flag indicating whether the differential modulation is permitted for the residual signals of the video sequence and information on a maximum block size for which the differential modulation is permitted. The apparatus further comprises means for decoding a first chroma syntax element indicating whether the differential modulation has been applied to a chroma block corresponding to a first block, when the first block to be currently decoded satisfies conditions defined by the information on the chroma sampling format and the high level syntax elements. The apparatus further comprises means for decoding a second chroma syntax element indicating a differential modulation direction applied to the chroma block in response to the first chroma syntax element indicating that the differential modulation has been applied to the chroma block. The apparatus further comprises means for determining a differential-modulated residual block for the chroma block from the bitstream. The apparatus further comprises means for determining quantized residual values by differential-demodulating the differential-modulated residual block in the differential modulation direction indicated by the second chroma syntax element. The apparatus further comprises means for inversely quantizing the quantized residual values for the chroma block. The apparatus further comprises means for generating predicted values for the chroma block. The apparatus further comprises means for reconstructing the chroma block corresponding to the first block based on the inversely quantized residual values and the predicted values.

An aspect of the present disclosure provides a method for encoding a video sequence composed of a plurality of pictures. The method comprises encoding, in a sequence parameter set of a bitstream, information on a chroma sampling format and high level syntax elements related to differential modulation for residual signals. Herein, the high level syntax elements comprise a control flag indicating whether the differential modulation is permitted for the residual signals of the video sequence and information on a maximum block size for which the differential modulation is permitted. The method further comprises encoding a first chroma syntax element indicating whether the differential modulation has been applied to a chroma block corresponding to a first block, when the first block to be currently decoded satisfies conditions defined by the information on the chroma sampling format and the high level syntax elements. The method further comprises encoding a second chroma syntax element indicating a differential modulation direction applied to the chroma block in response to the first chroma syntax element indicating that the differential modulation has been applied to the chroma block. The method further comprises generating predicted values for the chroma block. The method further comprises determining a residual block for the chroma block based on original sample values and the predicted values of the chroma block. The method further comprises generating quantized residual values by quantizing the residual block for the chroma block. The method further comprises determining differential-modulated residual values by differential-modulating the quantized residual values in the differential modulation direction indicated by the second chroma syntax element. The method further comprises encoding the differential-modulated residual values in the bitstream.

BRIEF DESCRIPTION OF THE DRAWINGS

In order that the disclosure may be well understood, there will now be described various forms thereof, given by way of example, reference being made to the accompanying drawings, in which.

Figure 1:
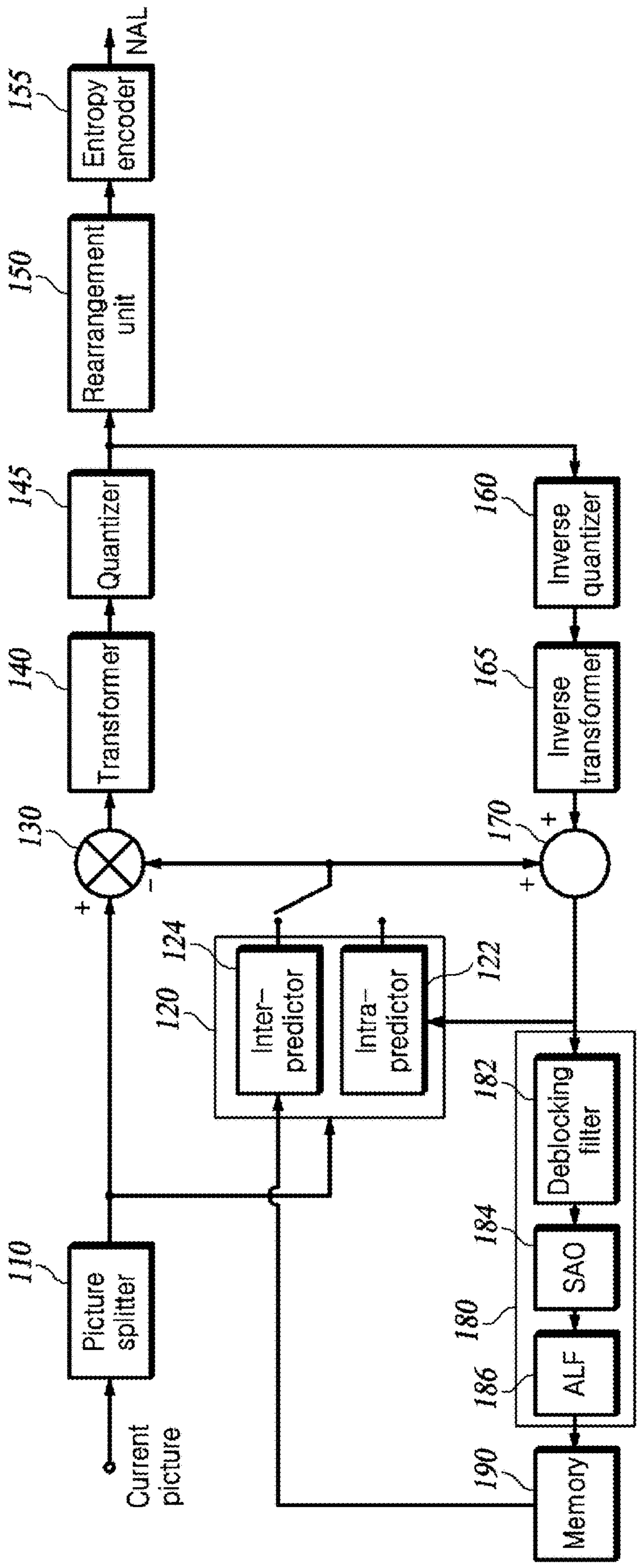
FIG. 1 is a block diagram of a video encoding apparatus capable of implementing the techniques of the present disclosure.

The drawings described herein are for illustration purposes only and are not intended to limit the scope of the present disclosure in any way.

DESCRIPTION OF EMBODIMENTS

Hereinafter, some embodiments of the present disclosure are described in detail with reference to the accompanying drawings. It should be noted that, in assigning reference numerals to the constituent elements in the respective drawings, like reference numerals designate like elements, although the elements are shown in different drawings. Further, in the following description of the present disclosure, a detailed description of known functions and configurations incorporated herein has been omitted to avoid obscuring the subject matter of the present disclosure. When a component, device, element, or the like of the present disclosure is described as having a purpose or performing an operation, function, or the like, the component, device, or element should be considered herein as being "configured to" meet that purpose or to perform that operation or function.

FIG. 1 is a block diagram of a video encoding apparatus capable of implementing the techniques of the present disclosure. Hereinafter, a video encoding apparatus and elements of the apparatus is described with reference to FIG. 1.

The video encoding apparatus includes a picture splitter 110, a predictor 120, a subtractor 130, a transformer 140, a quantizer 145, a reorganizer 150, an entropy encoder 155, an inverse quantizer 160, an inverse transformer 165, an adder 170, a loop filter unit 180, and a memory 190.

Each element of the video encoding apparatus may be implemented in hardware or software, or a combination of hardware and software. The functions of the respective elements may be implemented as software, and a microprocessor may be implemented to execute the software functions corresponding to the respective elements.

One video includes a plurality of pictures. Each picture is split into a plurality of regions, and encoding is performed on each region. For example, one picture is split into one or more tiles and/or slices. Here, the one or more tiles may be defined as a tile group. Each tile or slice is split into one or more coding tree units (CTUs). Each CTU is split into one or more coding units (CUs) by a tree structure. Information applied to each CU is encoded as a syntax of the CU, and information applied to CUs included in one CTU in common is encoded as a syntax of the CTU. In addition, information applied to all blocks in one slice in common is encoded as a syntax of a slice header, and information applied to all blocks constituting one or more pictures is encoded in a picture parameter set (PPS) or a picture header. Furthermore, information, which a sequence composed of a plurality of pictures refers to in common, is encoded in a sequence parameter set (SPS). Information applied to one tile or tile group in common may be encoded as a syntax of a tile or tile group header.

The picture splitter 110 determines the size of a coding tree unit (CTU). Information about the size of the CTU (CTU size) is encoded as a syntax of the SPS or PPS and is transmitted to the video decoding apparatus.

The picture splitter 110 splits each picture constituting the video into a plurality of CTUs having a predetermined size and then recursively splits the CTUs using a tree structure. In the tree structure, a leaf node serves as a coding unit (CU), which is a basic unit of coding.

The tree structure may be a QuadTree (QT), in which a node (or parent node) is split into four sub-nodes (or child nodes) of the same size. The tree structure may also be a Binary Tree (BT), in which a node is split into two sub-nodes. The tree structure may also be a TernaryTree (TT), in which a node is split into three sub-nodes at a ratio of 1:2:1. The tree structure may also be a structure formed by a combination of two or more of the QT structure, the BT structure, and the TT structure. For example, a QuadTree plus BinaryTree (QTBT) structure may be used, or a QuadTree plus BinaryTree TernaryTree (QTBTTT) structure may be used. Here, BTTT may be collectively referred to as a multiple-type tree (MTT).

Figure 2:
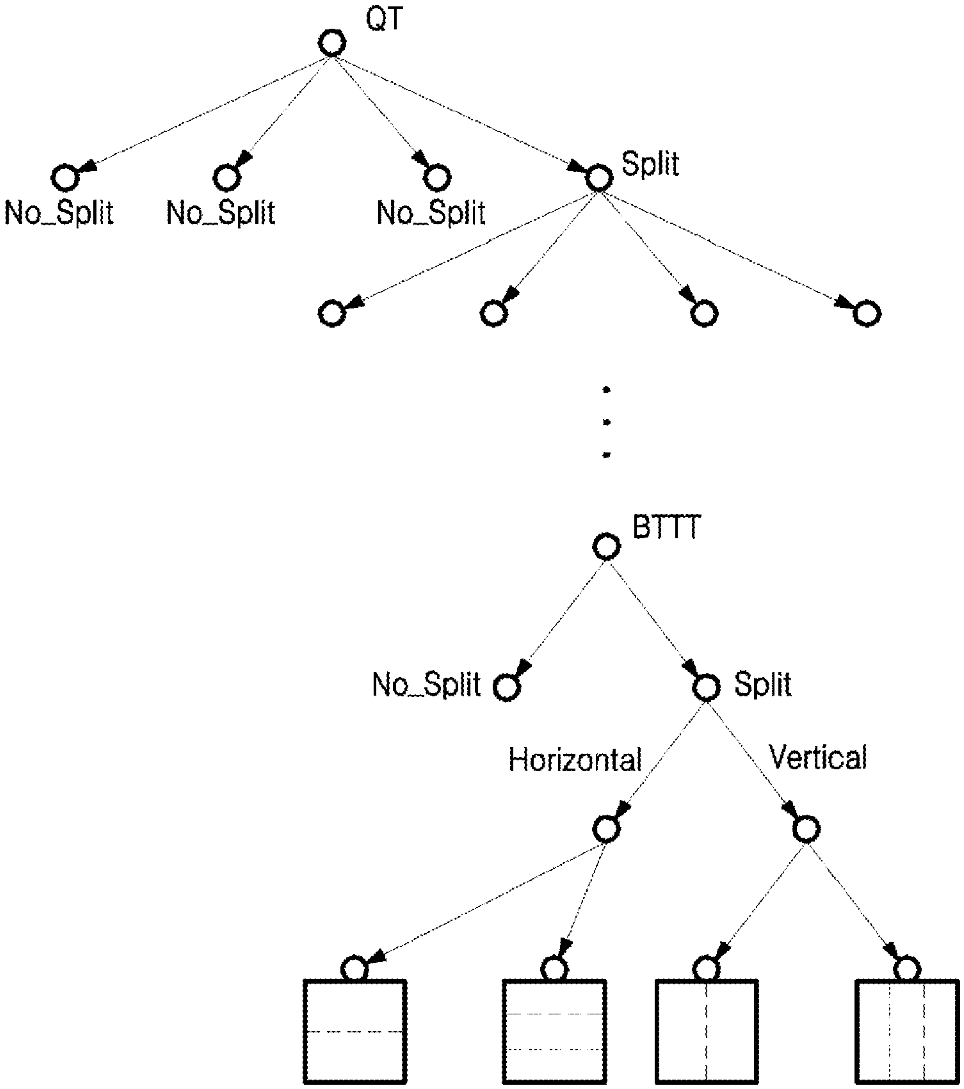
FIG. 2 is a diagram illustrating block splitting using a QuadTree plus BinaryTree Ternary Tree (QTBTTT) structure.

FIG. 2 shows a QTBTTT splitting tree structure. As shown in FIG. 2, a CTU may be initially split in the QT structure. The QT splitting may be repeated until the size of the splitting block reaches the minimum block size MinQTSize of a leaf node allowed in the QT. A first flag (QT_split_flag) indicating whether each node of the QT structure is split into four nodes of a lower layer is encoded by the entropy encoder 155 and signaled to the video decoding apparatus. When the leaf node of the QT is not larger than the maximum block size (MaxBTSize) of the root node allowed in the BT, it may be further split into one or more of the BT structure or the TT structure. The BT structure and/or the TT structure may have a plurality of splitting directions. For example, there may be two directions, namely, a direction in which a block of a node is horizontally split and a direction in which the block is vertically split. As shown in FIG. 2, when MTT splitting is started, a second flag (mtt_split_flag) indicating whether nodes are split, a flag indicating a splitting direction (vertical or horizontal) in the case of splitting, and/or a flag indicating a splitting type (Binary or Ternary) are encoded by the entropy encoder 155 and signaled to the video decoding apparatus. Alternatively, prior to encoding the first flag (QT_split_flag) indicating whether each node is split into 4 nodes of a lower layer, a CU splitting flag (split_cu_flag) indicating whether the node is split may be encoded. When the value of the CU split flag (split_cu_flag) indicates that splitting is not performed, the block of the node becomes a leaf node in the splitting tree structure and serves a coding unit (CU), which is a basic unit of encoding. When the value of the CU split flag (split_cu_flag) indicates that splitting is performed, the video encoding apparatus starts encoding the flags in the manner described above, starting with the first flag.

When QTBT is used as another example of a tree structure, there may be two splitting types, which are a type of horizontally splitting a block into two blocks of the same size (i.e., symmetric horizontal splitting) and a type of vertically splitting a block into two blocks of the same size (i.e., symmetric vertical splitting). A split flag (split_flag) indicating whether each node of the BT structure is split into block of a lower layer and splitting type information indicating the splitting type are encoded by the entropy encoder 155 and transmitted to the video decoding apparatus. There may be an additional type of splitting a block of a node into two asymmetric blocks. The asymmetric splitting type may include a type of splitting a block into two rectangular blocks at a size ratio of 1:3 or may include a type of diagonally splitting a block of a node.

CUs may have various sizes according to QTBT or QTBTTT splitting of a CTU. Hereinafter, a block corresponding to a CU (i.e., a leaf node of QTBTTT) to be encoded or decoded is referred to as a "current block." As QTBTTT splitting is employed, the shape of the current block may be square or rectangular.

The predictor 120 predicts the current block to generate a prediction block. The predictor 120 includes an intra-predictor 122 and an inter-predictor 124.

Figure 3:
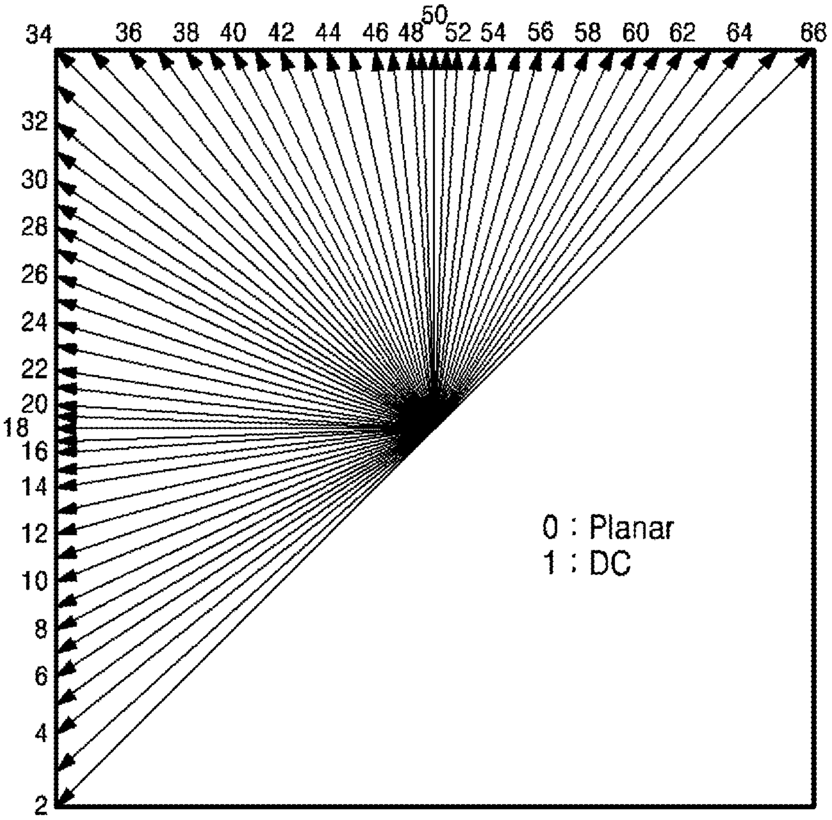
FIG. 3 is a diagram illustrating a plurality of intra-prediction modes.

The intra-prediction unit 122 predicts pixels in the current block using pixels (reference pixels) positioned around the current block in the current picture including the current block. There is a plurality of intra-prediction modes according to the prediction directions. For example, as shown in FIG. 3, the plurality of intra-prediction modes may include two non-directional modes, which include a planar mode and a DC mode, and 65 directional modes. Neighboring pixels and an equation to be used are defined differently for each prediction mode.

The intra-predictor 122 may determine an intra-prediction mode to be used in encoding the current block. In some examples, the intra-predictor 122 may encode the current block using several intra-prediction modes and select an appropriate intra-prediction mode to use from the tested modes. For example, the intra-predictor 122 may calculate rate distortion values using rate-distortion analysis of several tested intra-prediction modes and may select an intra-prediction mode that has the best rate distortion characteristics among the tested modes.

The intra-predictor 122 selects one intra-prediction mode from among the plurality of intra-prediction modes and predicts the current block using neighboring pixels (reference pixels) and an equation determined according to the selected intra-prediction mode. Information about the selected intra-prediction mode is encoded by the entropy encoder 155 and transmitted to the video decoding apparatus.

The inter-predictor 124 generates a prediction block for the current block through motion compensation. The inter-predictor 124 searches for a block most similar to the current block in a reference picture, which has been encoded and decoded earlier than the current picture. The inter-predictor 124 also generates a prediction block for the current block using the searched block. Then, the inter-predictor generates a motion vector corresponding to a displacement between the current block in the current picture and the prediction block in the reference picture. In general, motion estimation is performed on a luma component, and a motion vector calculated based on the luma component is used for both the luma component and the chroma component. The motion information including information about the reference picture and information about the motion vector used to predict the current block is encoded by the entropy encoder 155 and transmitted to the video decoding apparatus. The inter-predictor 124 may perform interpolation on a reference picture or a reference block in order to increase the accuracy of prediction. In other words, subpixels between two consecutive integer pixels are interpolated by applying filter coefficients to a plurality of consecutive integer pixels including the two integer pixels. When a process of searching for a block that is most similar to the current block for the interpolated reference picture is performed, the motion vector may be expressed not to the precision of the integer pixel but to the precision of the decimal unit. The precision or resolution of the motion vector may be set differently for each unit of a target region to be encoded, such as a slice, tile, CTU, or CU.

The subtractor 130 subtracts the prediction block generated by the intra-predictor 122 or the inter-predictor 124 from the current block to generate a residual block.

The transformer 140 may transform residual signals in a residual block. a two-dimensional size of the residual block, may be used as a transform unit (hereinafter, "TU"), a block size in which the transform is performed. Alternatively, the residual block may be partitioned into a plurality of subblocks, and each subblock may be used as a TU to transform the residual signals within the corresponding subblock.

The transformer 140 may split the residual block into one or more subblocks and apply the transformation to the one or more subblocks. Thus, the residual values of the transform blocks may be transformed from the pixel domain to the frequency domain. In the frequency domain, the transformed blocks are referred to as coefficient blocks or transform blocks containing one or more transform coefficient values. A two-dimensional transform kernel may be used for transformation and one-dimensional transform kernels may be used for horizontal transformation and vertical transformation, respectively. The transform kernels may be based on a discrete cosine transform (DCT), a discrete sine transform (DST), or the like.

The transformer 140 may individually transform the residual block in a horizontal direction and a vertical direction. For transformation, various types of transform functions or transform matrices may be used. For example, a pair of transform functions for transformation in the horizontal direction and the vertical direction may be defined as a multiple transform set (MTS). The transformer 140 may select one transform function pair having the best transform efficiency in the MTS and transform the residual block in the horizontal and vertical directions, respectively. Information (mts_idx) on the transform function pair selected from the MTS is encoded by the entropy encoder 155 and signaled to the video decoding apparatus.

The quantizer 145 quantizes transform coefficients output from the transformer 140 using quantization parameters and outputs the quantized transform coefficients to the entropy encoder 155. For some blocks or frames, the quantizer 145 may directly quantize a related residual block without transformation. The quantizer 145 may apply different quantization coefficients (scaling values) according to positions of the transform coefficients in the transform block. A matrix of quantization coefficients applied to quantized transform coefficients arranged in two dimensions may be encoded and signaled to the video decoding apparatus.

The reorganizer 150 may reorganize the coefficient values for the quantized residual value. The reorganizer 150 may change the 2-dimensional array of coefficients into a 1-dimensional coefficient sequence through coefficient scanning. For example, the reorganizer 150 may scan coefficients from a DC coefficient to a coefficient in a high frequency region using a zig-zag scan or a diagonal scan to output a 1-dimensional coefficient sequence. Depending on the size of the transformation unit and the intra-prediction mode, a vertical scan in which a two-dimensional array of coefficients is scanned in a column direction or a horizontal scan in which two-dimensional block-shaped coefficients are scanned in a row direction may be used instead of the zig-zag scan. In other words, a scan mode to be used may be determined among the zig-zag scan, the diagonal scan, the vertical scan, and the horizontal scan according to the size of the transformation unit and the intra-prediction mode.

The entropy encoder 155 encodes the one-dimensional quantized transform coefficients output from the reorganizer 150 using various encoding techniques, such as Context-based Adaptive Binary Arithmetic Code (CABAC) and exponential Golomb, to generate a bitstream.

The entropy encoder 155 encodes information such as a CTU size, a CU split flag, a QT split flag, an MTT splitting type, and an MTT splitting direction, which are associated with block splitting, such that the video decoding apparatus may split the block in the same manner as in the video encoding apparatus. In addition, the entropy encoder 155 encodes information about a prediction type indicating whether the current block is encoded by intra-prediction or inter-prediction and encodes intra-prediction information (i.e., information about an intra-prediction mode) or inter-prediction information (information about a reference picture index and a motion vector) according to the prediction type. In addition, the entropy encoder 155 encodes information related to quantization, i.e., information on quantization parameters and information on a quantization matrix.

The inverse quantizer 160 inversely quantizes the quantized transform coefficients output from the quantizer 145 to generate transform coefficients. The inverse transformer 165 transforms the transform coefficients output from the inverse quantizer 160 from the frequency domain to the spatial domain and reconstructs the residual block.

The adder 170 adds the reconstructed residual block to the prediction block generated by the predictor 120 to reconstruct the current block. The pixels in the reconstructed current block are used as reference pixels in performing intra-prediction of a next block.

The loop filter unit 180 filters the reconstructed pixels to reduce blocking artifacts, ringing artifacts, and blurring artifacts generated due to block-based prediction and transformation/quantization. The loop filter unit 180 may include one or more of a deblocking filter 182, a sample adaptive offset (SAO) filter 184, or an adaptive loop filter (ALF) 186.

The deblocking filter 182 filters the boundary between the reconstructed blocks to remove blocking artifacts caused by block-by-block coding/decoding, and the SAO filter 184 performs additional filtering on the deblocking-filtered video. The SAO filter 184 is a filter used to compensate for a difference between a reconstructed pixel and an original pixel caused by lossy coding and performs filtering in a manner of adding a corresponding offset to each reconstructed pixel. The ALF 186 performs filtering on a target pixel to be filtered by applying filter coefficients to the target pixel and neighboring pixels of the target pixel. The ALF 186 may divide the pixels included in a picture into predetermined groups and then determine one filter to be applied to a corresponding group to differentially perform filtering on each group. Information about filter coefficients to be used for the ALF may be encoded and signaled to the video decoding apparatus.

The reconstructed blocks filtered through the loop filter unit 180 are stored in the memory 190. Once all blocks in one picture are reconstructed, the reconstructed picture may be used as a reference picture for inter-prediction of blocks in a picture to be encoded next.

Figure 4:
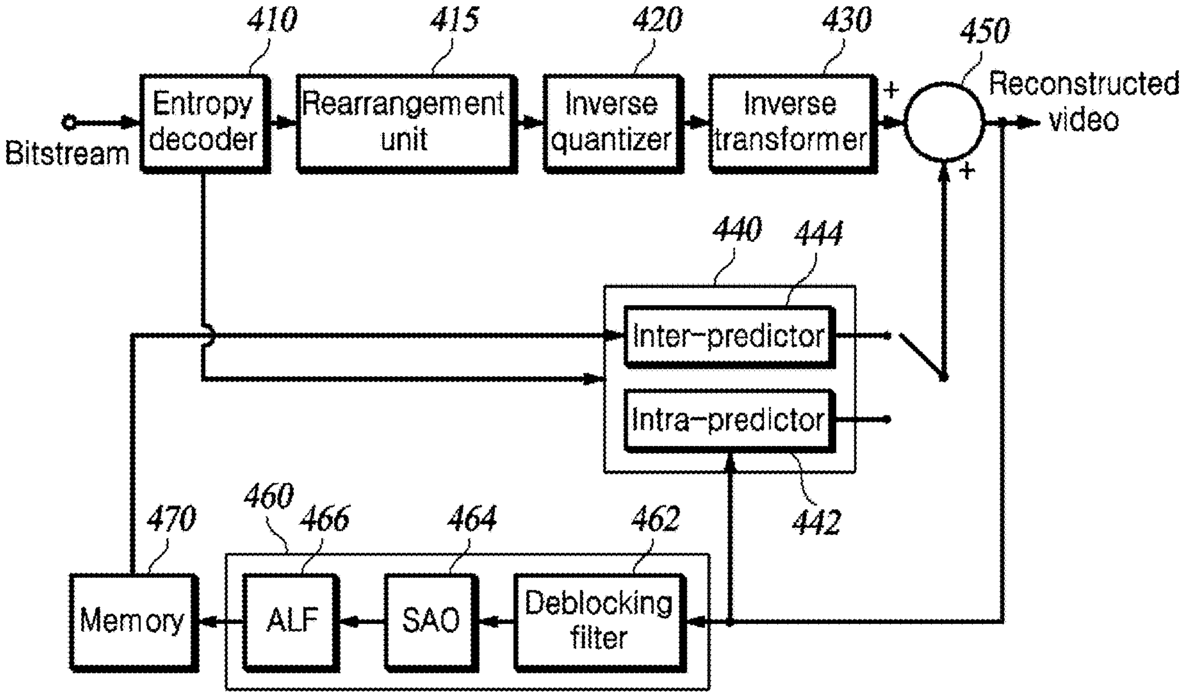
FIG. 4 is a block diagram of a video decoding apparatus capable of implementing the techniques of the present disclosure.

FIG. 4 is a functional block diagram of a video decoding apparatus capable of implementing the techniques of the present disclosure. Hereinafter, the video decoding apparatus and elements of the apparatus are described with reference to FIG. 4.

The video decoding apparatus may include an entropy decoder 410, a reorganizer 415, an inverse quantizer 420, an inverse transformer 430, a predictor 440, an adder 450, a loop filter unit 460, and a memory 470.

Similar to the video encoding apparatus of FIG. 1, each element of the video decoding apparatus may be implemented in hardware, software, or a combination of hardware and software. Further, the function of each element may be implemented in software, and the microprocessor may be implemented to execute the function of software corresponding to each element.

The entropy decoder 410 determines a current block to be decoded by decoding a bitstream generated by the video encoding apparatus and extracting information related to block splitting. The entropy decoder 410 also extracts prediction information and information about a residual signal, and the like required to reconstruct the current block.

The entropy decoder 410 extracts information about the CTU size from the sequence parameter set (SPS) or the picture parameter set (PPS), determines the size of the CTU, and splits a picture into CTUs of the determined size. Then, the decoder determines the CTU as the uppermost layer, i.e., the root node of a tree structure, and extracts splitting information about the CTU to split the CTU using the tree structure.

For example, when the CTU is split using a QTBTTT structure, a first flag (QT_split_flag) related to splitting of the QT is extracted to split each node into four nodes of a sub-layer. For a node corresponding to the leaf node of the QT, the second flag (MTT_split_flag) and information about a splitting direction (vertical/horizontal) and/or a splitting type (binary/ternary) related to the splitting of the MTT are extracted to split the corresponding leaf node in the MTT structure. Each node below the leaf node of QT is thereby recursively split in a BT or TT structure.

As another example, when a CTU is split using the QTBTTT structure, a CU split flag (split_cu_flag) indicating whether to split a CU may be extracted. When the corresponding block is split, the first flag (QT_split_flag) may be extracted. In the splitting operation, zero or more recursive MTT splitting may occur for each node after zero or more recursive QT splitting. For example, the CTU may directly undergo MTT splitting without the QT splitting, or undergo only QT splitting multiple times.

As another example, when the CTU is split using the QTBT structure, the first flag (QT_split_flag) related to QT splitting is extracted, and each node is split into four nodes of a lower layer. Then, a split flag (split_flag) indicating whether a node corresponding to a leaf node of QT is further split in the BT and the splitting direction information are extracted.

Once the current block to be decoded is determined through splitting in the tree structure, the entropy decoder 410 extracts information about a prediction type indicating whether the current block is intra-predicted or inter-predicted. When the prediction type information indicates intra-prediction, the entropy decoder 410 extracts a syntax element for the intra-prediction information (intra-prediction mode) for the current block. When the prediction type information indicates inter-prediction, the entropy decoder 410 extracts a syntax element for the inter-prediction information, i.e., information indicating a motion vector and a reference picture referred to by the motion vector.

The entropy decoder 410 also extracts information about quantized transform coefficients of the current block as information related to quantization and information about residual signals The reorganizer 415 may change the sequence of the one-dimensional quantized transform coefficients entropy-decoded by the entropy decoder 410 to a 2-dimensional coefficient array (i.e., block) in a reverse order of the coefficient scanning performed by the video encoding apparatus.

The inverse quantizer 420 inversely quantizes the quantized transform coefficients using the quantization parameter. The inverse quantizer 420 may apply different quantization coefficients (scaling values) to the quantized transform coefficients arranged in two dimensions. The inverse quantizer 420 may perform inverse quantization by applying a matrix of quantization coefficients (scaling values) from the video encoding apparatus to a two-dimensional array of quantized transform coefficients.

The inverse transformer 430 inversely transforms the inversely quantized transform coefficients from the frequency domain to the spatial domain to reconstruct residual signals. A reconstructed residual block for the current block is thereby generated. In addition, when the MTS is applied, the inverse transformer 430 determines transform functions or transform matrices to be applied in the horizontal and vertical directions, respectively, using the MTS information (mts_idx) signaled from the video encoding apparatus. The inverse transformer 430 also uses the determined transform functions to inversely transform the transform coefficients in the transform block in the horizontal and vertical directions.

The predictor 440 may include an intra-predictor 442 and an inter-predictor 444. The intra-predictor 442 is activated when the prediction type of the current block is intra-prediction, and the inter-predictor 444 is activated when the prediction type of the current block is inter-prediction.

The intra-predictor 442 determines an intra-prediction mode of the current block among a plurality of intra-prediction modes based on the syntax element for the intra-prediction mode extracted from the entropy decoder 410 and predicts the current block using the reference pixels around the current block according to the intra-prediction mode.

The inter-predictor 444 determines a motion vector of the current block and a reference picture referred to by the motion vector using the syntax element for the intra-prediction mode extracted from the entropy decoder 410 and predicts the current block based on the motion vector and the reference picture.

The adder 450 reconstructs the current block by adding the residual block output from the inverse transformer and the prediction block output from the inter-predictor or the intra-predictor. The pixels in the reconstructed current block are used as reference pixels in intra-predicting a block to be decoded next.

The loop filter unit 460 may include at least one of a deblocking filter 462, an SAO filter 464, or an ALF 466. The deblocking filter 462 deblocking-filters the boundary between the reconstructed blocks to remove blocking artifacts caused by block-by-block decoding. The SAO filter 464 performs filtering in a manner of adding the reconstructed block after deblocking filtering to corresponding offsets so as to compensate for a difference between the reconstructed pixel and the original pixel caused by lossy coding. The ALF 466 performs filtering on a target pixel to be filtered by applying filter coefficients to the target pixel and neighboring pixels of the target pixel. The ALF 466 may divide the pixels in a picture into predetermined groups and then may determine one filter to be applied to a corresponding group to differentially perform filtering on each group. The filter coefficient of the ALF is determined based on the information about the filter coefficient decoded from the bitstream.

The reconstructed block filtered through the loop filter unit 460 is stored in the memory 470. When all blocks in one picture are reconstructed, the reconstructed picture is used as a reference picture for inter-prediction of blocks in a picture to be encoded next.

In general, technologies of the present disclosure are related to the application of the differential modulation technique to a residual block of a block coded in a transform skip mode. The following description is basically focused on a decoding technology, i.e., an operation of a video decoder. A description of encoding technologies is opposite to a decoding technology that is comprehensively described and thus the description of encoding technologies is simplified.

In general, a video encoding apparatus transforms residual signals into transform coefficients in a frequency domain, encodes the transform coefficients, and signals them to a video decoding apparatus. The video decoding apparatus inversely transforms the transform coefficients into residual signals in a spatial domain. However, most of the transform coefficients generated as a result of the transform may be positioned in a high-frequency region, depending on the characteristics of the video or residual signals. In such a case, encoding the transform coefficients in the frequency domain obtained by the transform may degrade encoding efficiency compared to directly encoding the residual signals in the spatial domain.

A transform skip (TS) mode is a technique of entropy-encoding a residual signal without transforming the residual signal into signals in the frequency domain. In other words, the residual signal or a quantized residual signal in the spatial domain may be directly entropy-encoded without being transformed into the frequency domain. In general, the transform skip mode is not better in encoding performance than a discrete cosine transform (DCT). However, a particular type of content such as screen content may include many residuals in a high frequency region, due to the boundary of a graphic element with high color contrast. Thus, the transform skip mode may be useful.

Whether to apply the transform skip mode may be signaled for each transform unit (TU), which is a unit (block size) of transform. In other words, the video encoding apparatus encodes information indicating whether the transform skip mode is applied or not, for example, a transform skip flag (transform_skip_flag[x0][y0][cIdx]), for each transform unit and transmits it to the video decoding apparatus. Here, (x0, y0) is the position of the top left of a transform unit within the current picture, and cIdx is an indicator for indicating a color component, where a value "0" represents luma, a value "1" represents Cb of chroma, and a value "2" represents Cr of chroma.

Meanwhile, whether to enable the transform skip mode may be defined in a high-level syntax structure, for example, SPS or PPS. For example, the video encoding apparatus encodes, as a syntax of SPS, a transform skip enable flag (transform_skip_flag) indicating whether the transform skip mode is enabled or not. If the transform skip mode is not enabled (e.g., (transform_skip_enabled_flag=0), transform_skip_flag for each transform unit within the corresponding sequence is not encoded, and the residual signals in all the transform units are transformed. If transform_skip_flag does not exist in a bitstream, the video decoding apparatus sets transform_skip_enabled_flag=0 and performs inverse transform of received residual signals (transform coefficients). On the other hand, if the transform skip mode is enabled (e.g., transform_skip_enabled_flag=1), transform_skip_flag indicating whether transform skip is applied or not may be signaled for each transform unit. The video decoding apparatus performs or skips transform for a transform unit according to transform_skip_flag corresponding to the transform unit.

Meanwhile, a maximum size of a transform unit to which transform skip is applicable may be limited to MaxTsSize. The maximum size MaxTsSize may be a scalar value indicating the length of one side of a maximum transform unit for which the transform skip is permitted and may be a fixed value, such as 32 or 64. Alternatively, the video encoding apparatus may encode a syntax element indicating a maximum size MaxTsSize of a block to which the transform skip mode is applicable in a high level syntax structure, for example, an SPS or a PPS, and may deliver the syntax element to the video decoding apparatus. For example, the maximum size MaxTsSize of a block to which the transform skip mode is applicable may be controlled by a syntax element log2_transform_skip_max_size_minus2 in a sequential parameter set (SPS). In this case, the maximum size (MaxTsSize) of the block to which the transform skip mode is applicable is determined as follows.

$$MaxTsSize = 1 << (\text{log2\_transform\_skip\_max\_size\_minus2} + 2)$$

Residual signals within a transform unit having a width or height greater than MaxTsSize are always encoded after being transformed into transform coefficients. In other words, a transform skip is not permitted for a transform unit having a width or height greater than MaxTsSize. Accordingly, the video encoding apparatus does not encode transform_skip_flag with respect to a transform unit having a width or height greater than MaxTsSize. If transform_skip_flag is not present in a bitstream, the video decoding apparatus inversely transforms, into residual signals, the transform coefficients within a corresponding transform unit. In contrast, transform_skip_flag is encoded with respect to a transform unit having a width and a height equal to or smaller than MaxTsSize. Accordingly, the video decoding apparatus determines whether to perform inverse transform depending on a value of transform_skip_flag.

It has been described above that the maximum size (MaxTsSize) of a block to which the transform skip mode is applicable is a scalar value compared with the width and height of a transform unit (block), but the present disclosure is not limited thereto. In other words, in order to restrict the size of a block to which the transform skip mode is applicable, a maximum size may be individually defined or determined with respect to the width and height of each of the transform units for which the transform skip mode may be permitted. In this case, each of the syntax elements indicating a maximum width and maximum height of a transform unit for which the transform skip mode may be permitted may be signaled.

In this context, a disable condition for the transform skip mode related to the size of a block may be differently controlled with respect to the width and height of a block. That is, a maximum width (MaxTsSizeX) and maximum height (MaxTsSizeY) of a block to which the transform skip mode is applicable may be individually controlled. This may be useful in that a shape of a block may be rectangular as well as square, due to the adoption of a QTBTTT partition.

In other embodiments, such control may be achieved by introducing a syntax element log2_transform_skip_max_size_X_minus2 and log2_transform_skip_max_size_Y_minus2 signaled in an SPS. In this case, the maximum width (MaxTsSizeX) and maximum height (MaxTsSizeY) of a block to which the transform skip mode is applicable is determined as follows.

$$MaxTsSizeX = 1 << (\text{log2\_transform\_skip\_max\_size\_X\_minus2} + 2)$$

$$MaxTsSizeY = 1 << (\text{log2\_transform\_skip\_max\_size\_Y\_minus2} + 2)$$

In other some embodiments, the video encoder may signal, in an SPS, the syntax element log2_transform_skip_max_size_minus2, which indicates MaxTsSize. The video decoder may derive MaxTsSizeX and MaxTsSizeY based on a ratio of the width (CbWidth) and height (CbHeight) of a block from MaxTsSize. Specifically, the following method may be used.

(a) A scale factor(S) is derived as follows.

$$S=\max(CbWidth,CbHeight)/\min(CbWidth,CbHeight)$$

(b) Whether to apply the transform skip mode is determined by applying MaxTsSize in a greater or equal direction among CbWidth and CbHeight.

(c) Whether to apply the transform skip mode is determined by applying MaxTsSize in a small direction among CbWidth and CbHeight.

Hereinafter, a differential modulation technique capable of improving compression performance of a block coded in the transform skip mode is described.

Residual signals generated through intra prediction may be encoded using the differential modulation technique. The differential modulation technique, when used together with the transform skip mode, may provide further improved compression performance by reducing the total amount of energy of a residual component for entropy encoding. A method of applying the differential modulation to a target block is described below. Here, the target block may be a CU. Alternatively, the target block may be a TU. Hereinafter, for convenience of explanation, it is assumed that the target block is a CU.

1. Differential Modulation/Decoding Process

Figure 5A:
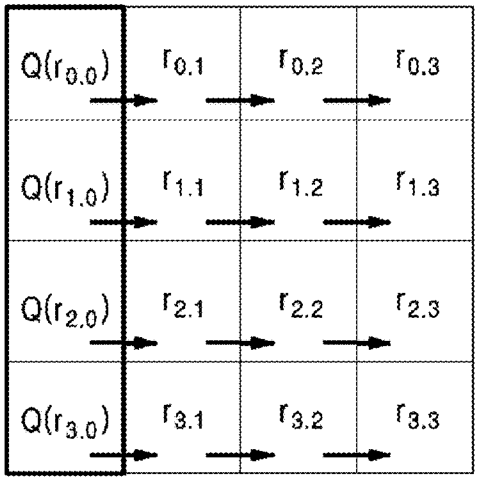
FIGS. 5A and 5B are diagrams for describing a differential modulation technique according to the present disclosure.
Figure 5B:
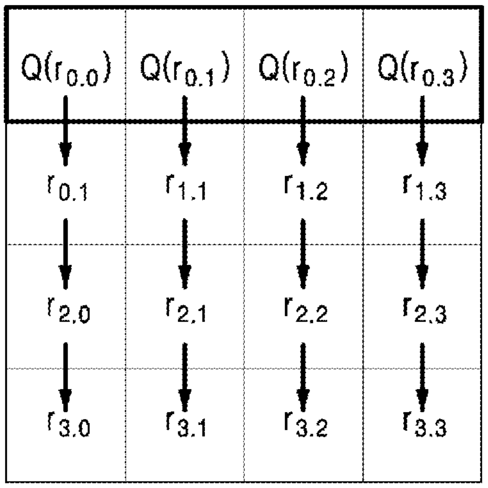

FIGS. 5A and 5B are diagrams for describing the differential modulation technique according to the present disclosure.

Differential modulation may be performed in a horizontal direction or a vertical direction. If the differential modulation in a horizontal direction such as that illustrated in FIG. 5A is performed, the video encoding apparatus calculates a differential value between a target residual signal to be encoded within a residual block and an adjacent residual signal to the left of the target residual signal within the residual block. Furthermore, the video encoding apparatus entropy-encodes the differential value rather than a value itself of the target residual signal. After the horizontal direction differential modulation technique is applied to residual signals $r_{i,j}$ of a block of an N×M (N and M are natural numbers) size, the resultant residual signals $\tilde{r}_{i,j}$ ($0 \leq i < M-1$, i is a natural number) may be expressed as Equation 1. In other words, a residual signal at a position (i, j) is modified through a subtraction with a residual signal at a position (i, j−1). Here, (i, j) denotes an i-th row and a j-th column.

$$\tilde{r}_{i,j} = \begin{cases} Q(r_{i,j}), & i = 0,\ 0 \leq j \leq (N-1) \\ Q(r_{i,j}) - Q(r_{(i-1),j}), & 1 \leq i \leq (M-1),\ 0 \leq j \leq (N-1) \end{cases} \quad \text{[Equation 1]}$$

Here, Q(r) denotes a quantized residual signal. Differential modulation may be applied to the quantized residual signals for which a transform has been skipped.

As illustrated in Equation 1, in the case of the horizontal direction differential modulation, the video encoding apparatus entropy-encodes the residual signals $\tilde{r}_{i,j}$ and then transmits it to the video decoding apparatus. The differential modulation in the horizontal direction may be sequentially performed on all columns of the block.

Meanwhile, if the differential modulation in the vertical direction is performed as illustrated in FIG. 5B, the video encoding apparatus calculates a differential value between a target residual signal to be encoded within a residual block and an adjacent residual signal above the target residual signal within the residual block. Furthermore, the video encoding apparatus entropy-encodes the differential value rather than a value itself of the target residual signal. After the differential modulation technique in the vertical direction is applied to a residual signals $r_{i,j}$ of a block of an N×M (M and N are natural numbers) size, the resultant residual signals $\tilde{r}_{i,j}$($0 \leq j < N-1$, j is a natural number) may be expressed as Equation 2. In other words, a residual signal at a position (i, j) is modified through a subtraction with a residual signal at a position (i−1, j). Here, (i, j) denotes an i-th row and a j-th column.

$$\tilde{r}_{i,j} = \begin{cases} Q(r_{i,j}), & 0 \leq i \leq (M-1),\ j = 0 \\ Q(r_{i,j}) - Q(r_{i,(j-1)}), & 0 \leq i \leq (M-1),\ 1 \leq j \leq (N-1) \end{cases} \quad \text{[Equation 2]}$$

As illustrated in Equation 2, in the case of the vertical direction differential modulation, the video encoding apparatus entropy-encodes the residual signals $\tilde{r}_{i,j}$ and then transmits it to the video decoding apparatus. The differential modulation in the vertical direction may be sequentially performed on all rows of the block.

If the differential modulation technique in the horizontal direction has been applied, the video decoding apparatus reconstructs the residual signals as illustrated in Equation 3. In other words, the video decoding apparatus modifies residual signals (i.e., differential-modulated residual signals) within a residual block reconstructed from a bitstream through an inverse process (hereinafter referred to as "differential demodulation") of differential modulation in the horizontal direction. A target residual signal to be modified within the residual block is modified in a way that left residual signals, positioned on the left of the target residual signal in the same row as the target residual signal, are added to the target residual signal.

$$Q(r_{i,j}) = \sum_{k=0}^{j} \tilde{r}_{i,k},\ 0 \leq i \leq (M-1),\ 0 \leq j \leq (N-1) \quad \text{[Equation 3]}$$

Meanwhile, if the differential modulation technique in the vertical direction has been applied, the video decoding apparatus reconstructs the residual signals as illustrated in Equation 4. In other words, the video decoding apparatus modifies residual signals (i.e., differential-modulated residual signals) within a residual block reconstructed from a bitstream based on a vertical direction differential demodulation. A target residual signal to be modified within the reconstructed residual block is modified in a way that upper residual signals, positioned above the target residual signal in the same column as the target residual signal, are added to the target residual signal.

$$Q(r_{i,j}) = \sum_{k=0}^{i} \tilde{r}_{k,j},\ 0 \leq i \leq (M-1),\ 0 \leq j \leq (N-1) \quad \text{[Equation 4]}$$

The residual signals modified based on the differential demodulation are inversely quantized and then added to prediction pixels.

The video encoding apparatus signals, to the video decoding apparatus, information on whether differential modulation is applied to a target block to be encoded and the direction of the differential modulation. This is described below.

The differential modulation technique may be applied to the residual signals generated through intra prediction. In other words, if it is determined the differential modulation technique is applied to the target block, the target block is predicted using intra prediction.

An intra prediction mode of the target block may be derived from the direction of the differential modulation. In other embodiments, the intra prediction mode of the target block is inferred as being the same as the direction of the differential modulation. The intra-predicted residual signals tend to have similar patterns in the intra prediction direction. Accordingly, if the differential modulation is applied in the same direction as the intra prediction direction, encoding efficiency can be increased because a differential value between the residual signals is small.

Accordingly, for a block to which the differential modulation is applied, the intra predictors 122 and 422 of the video encoding apparatus and the video decoding apparatus set, as an intra prediction mode of a target block, an intra prediction mode (e.g., INTRA_ANGULAR 18 or INTRA_ANGULAR 50 in FIG. 3) in the same direction as the direction of the differential modulation. This means that the signaling of information on the intra prediction mode is not required. By inferring the intra prediction mode of a block to which the differential modulation has been applied from the direction of the differential modulation, bits necessary to encode information on the intra prediction mode of the block are removed. In other words, the number of bits transmitted is reduced by inferring the intra prediction mode from a syntax for the direction of a differential modulation.

In other embodiments, if the differential modulation is applied, an intra prediction mode of a current block may be restricted to use only intra prediction modes within a threshold range from the direction of the differential modulation. For example, if the differential modulation in the horizontal direction is applied, only a horizontal mode (INTRA_ANGULAR 18 in FIG. 3) and a preset number of intra prediction modes close to the horizontal mode, among all intra prediction modes, are permitted as an intra prediction mode of a target block. If the differential modulation in the vertical direction is applied, only a vertical mode (INTRA_ANGULAR50 in FIG. 3) and a preset number of intra prediction modes close to the vertical mode among all intra prediction modes are permitted as an intra prediction mode of a target block.

Accordingly, since an intra prediction mode of a target block is selected from among some intra prediction modes similar to the differential modulation direction, rather than from among all intra prediction modes, the number of bits necessary to encode the intra prediction mode of the target block can be reduced. The video decoding apparatus may generate a candidate set composed of intra prediction modes within a threshold range from a differential modulation direction and may set, as an intra prediction mode of a target block, a candidate indicated by information on an intra prediction mode received from the video encoding apparatus, among candidates in the candidate set.

It has been described that the differential modulation technique is applied to only residual signals generated through intra prediction. However, the present disclosure is not limited thereto and the differential modulation technique may be used together with inter prediction.

The above-described differential modulation technique may be applied to both the luma component and chroma component of a target block. If it is determined that the differential modulation technique is applied to a target block, the differential modulation technique may be applied to each of residual signals of a luma component and residual signals of a chroma component of the target block. Alternatively, whether to apply a differential encoding technique or not may be determined independently for the luma component and the chroma component of the target block.

Hereinafter, a method for controlling the application of the differential modulation technique is described.

2. Control of Differential Modulation in a High Level

Differential modulation may improve or degrade compression performance depending on texture of content. Encoding syntax elements related to the differential modulation in a block level with respect to a video sequence for which the application of the differential modulation is not suitable becomes a factor to degrade compression performance. Accordingly, whether to apply the differential modulation is determined in the unit of each video sequence composed of a plurality of pictures.

In some embodiments, the video encoding apparatus encodes, in an SPS, a differential modulation enable flag indicating whether the differential modulation in a block level is permitted. As described above, the differential modulation is applied together with the transform skip mode. Accordingly, when the transform skip enable flag in the SPS indicates that the transform skip is permitted (i.e., transform_skip_enabled_flag=1), the differential modulation enable flag indicating whether the differential modulation is permitted is encoded. When the transform skip enable flag indicating that the transform skip is not permitted (i.e., transform_skip_enabled_flag=0), the differential modulation enable flag is not encoded. When the differential modulation enable flag is not present in the SPS, the video decoding apparatus sets the differential modulation enable flag to 0. In other words, the video decoding apparatus does not apply the differential demodulation technique to a current video sequence.

The differential modulation technique may be applied to both a luma component and chroma components unless a chroma format is monochrome (i.e., unless chroma_format_idc=0). In other embodiments, whether the differential modulation technique is applied to both the luma component and chroma components of a current video sequence may be controlled by the differential modulation enable flag signaled in an SPS. For example, when the differential modulation enable flag signaled in the SPS indicates that the differential modulation is permitted, the differential modulation technique may be applied to each of the luma component and chroma components of the current video sequence. In contrast, when the differential modulation enable flag indicates that the differential modulation is not permitted, the differential modulation is not permitted for both the luma and chroma components within the current video sequence.

In other embodiments, whether to apply the differential modulation to each of a luma component and chroma components in a sequence level may be individually controlled. This may be achieved by encoding, in an SPS, a first differential modulation enable flag indicating whether the differential modulation is permitted for the luma component of a current video sequence and a second differential modulation enable flag indicating whether the differential modulation is permitted for the chroma components of the current video sequence. The first and second differential modulation enable flags may be encoded when the transform skip enable flag has a value of "1".

Hereinafter, a method of controlling whether to apply the differential modulation in a block level when the differential modulation is permitted for luma and/or chroma components in a block level through the aforementioned high level syntax is described.

3. Control of Differential Modulation in a Block Level

Differential modulation for a target block is controlled by a first syntax element indicating whether to apply the differential modulation and a second syntax element indicating a direction of the differential modulation. The first and second syntax elements for controlling the differential modulation may be separately signaled with respect to the luma component and the chroma component of the target block.

If the differential modulation is permitted for the luma component of a current video sequence (or a picture belonging to the sequence), the video encoding apparatus encodes the first syntax element indicating whether the differential modulation is applied to the luma components (hereinafter referred to as a "luma block") of a target block. When the first syntax element indicates that the differential modulation is applied to the luma block, the video encoding apparatus additionally encodes the second syntax element indicating a differential modulation direction for the luma block.

As described above, the differential modulation is a tool, which may be applied in a residual block coded in the transform skip mode. When each of the width and height of a target block is greater than a maximum block size (MaxTsSize) for a transform skip, the differential modulation in addition to the transform skip is also not permitted. Accordingly, when each of the width and height of the target block is greater than the maximum block size for the transform skip, the video encoding apparatus does not encode the first syntax element and the second syntax element for the luma block. Accordingly, the first and second syntax elements for the luma block are not present within a bitstream, and the differential modulation for residual signals is also not performed.

When each of the width and height of a target block is equal to or smaller than the maximum block size (MaxTsSize), the video decoding apparatus extracts the first syntax element from a bitstream and determines whether the differential modulation has been applied to a luma block corresponding to the target block. When the first syntax element indicates that the differential modulation has been applied, the video decoding apparatus determines a direction of the differential modulation by extracting the second syntax element from a bitstream. In contrast, when at least one of the width or height of the target block is greater than the maximum block size (MaxTsSize), the video decoding apparatus does not extract the first syntax element, and a value of the first syntax element is set as a value indicating the differential modulation has not been applied. Accordingly, the video decoding apparatus does not also extract the second syntax element and does not perform the differential demodulation for the luma block.

Meanwhile, if it has been determined that the differential modulation is permitted for a chroma component of a video sequence, the video encoding apparatus encodes the first syntax element indicating whether the differential modulation is applied to a chroma component (hereinafter referred to as "chroma block") of a target block. When the first syntax element indicates that the differential modulation is applied to a chroma block, the video encoding apparatus encodes the second syntax element indicating a differential modulation direction of the chroma block.

Constraints for restricting the size of a chroma block to which the differential modulation is applied within a range in which a transform skip is permitted are also required. In particular, in the case of a target block (CU) partitioned from a CTU by a QTBT or QTBTTT partition structure, the target block may have a rectangular shape whose width and height are different in addition to a square shape. Accordingly, the constraints need to be satisfied by considering the variety of a target block shape.

In some embodiments, whether such requirements are satisfied may be checked using the maximum block size (MaxTsSize) for a transform skip and a chroma sampling format. A header (i.e., SPS) of a video sequence includes a syntax element (chroma_format_idc) indicating a chroma sampling format of the video sequence. A chroma sampling format, a horizontal scaling factor (Sub WidthC), and a vertical scaling factor (SubHeightC) may be defined as in Table 1 below based on a chroma_format_idc.

TABLE 1

| chroma_format_idc | Chroma format | SubWidthC | SubHeightC |
|---|---|---|---|
| 0 | Monochrome | 1 | 1 |
| 1 | 4:2:0 | 2 | 2 |
| 2 | 4:2:2 | 2 | 1 |
| 3 | 4:4:4 | 1 | 1 |

In order to apply the differential modulation to a chroma block, a condition in which each of the values obtained by dividing the width and height of a target block by a horizontal scaling factor (Sub WidthC) and a vertical scaling factor (SubHeightC) determined based on a chroma format, respectively, needs to be smaller than or equal to the maximum block size (MaxTsSize) for a transform skip needs to be satisfied. Accordingly, when a value obtained by dividing the width of the target block by the horizontal scaling factor (SubWidthC) is greater than MaxTsSize or a value obtained by dividing the height of the target block by the vertical scaling factor (SubHeightC) is greater than MaxTsSize, the differential modulation is not applied to the chroma block. The video encoding apparatus encodes the first syntax element indicating whether the differential modulation is applied to a chroma block only when the condition is satisfied, and the video encoding apparatus encodes the second syntax element indicating a differential modulation direction based on the first syntax element. If the condition is not satisfied, the first and second syntax elements for the chroma block are not encoded.

If the condition in which each of the values obtained by dividing the width and height of a target block by the horizontal scaling factor (SubWidthC) and the vertical scaling factor (SubHeightC) determined based on a chroma format, respectively, is smaller than or equal to the maximum block size (MaxTsSize) for a transform skip is satisfied, the video decoding apparatus extracts, from a bitstream, the first syntax element indicating whether the differential modulation has been applied to a chroma block. In this case, the video decoding apparatus also determines whether the differential modulation has been applied to a luma block corresponding to the target block. When the first syntax element indicates that the differential modulation has been applied, the video decoding apparatus determines a differential modulation direction of the chroma block by extracting the second syntax element from the bitstream.

In contrast, if the condition is not satisfied, the video decoding apparatus does not extract the first syntax element and sets a value of the first syntax element as a value indicating that the differential modulation has not been applied. Accordingly, the video decoding apparatus does not extract the second syntax element and does not perform the differential demodulation for the chroma block.

In other embodiments, whether the following requirements are satisfied may be checked by signaling information on a maximum size (MaxTsSizeC) of a block in which a transform skip may be applied to the chroma block. The requirements include that the size of a chroma block to which the differential modulation is applied needs to be restricted within a range in which a transform skip is permitted. In other words, information on the maximum size (MaxTsSizeC) for a chroma block may be signaled separately from the maximum size (MaxTsSize) for a luma block. Such information may be encoded in a high level syntax structure, such as an SPS, a PPS, or a picture header. The video encoding apparatus applies the differential modulation to a chroma block and encodes related syntaxes (i.e., the first and second syntax elements for the chroma block), only when the width and the height of a target block are equal to or smaller than MaxTsSizeC. Alternatively, the video encoding apparatus may apply the differential modulation to a chroma block and encode related syntaxes (i.e., the first and second syntax elements for the chroma block), only when each of the values obtained by dividing the width and the height of a target block by the width scaling factor (Sub WidthC) and the height scaling factor (SubHeightC), respectively, is equal to or smaller than MaxTsSizeC.

As described above, if the differential modulation has been applied, the video encoding apparatus intra-predicts a target block by using the intra prediction mode (INTRA_ANGULAR18 or INTRA_ANGULAR50 in FIG. 3) having the same direction as a differential modulation direction and generates a residual block, i.e., a difference between the target block and a prediction block. Residual signals within the residual block are quantized and then entropy-encoded after the differential modulation is performed in the differential modulation direction. The video decoding apparatus reconstructs the residual signals from a bitstream and modifies the residual signals by performing the differential demodulation in the differential modulation direction for the reconstructed residual signals. The modified residual signals are inversely quantized and then added to a prediction block. The video decoding apparatus also generates the prediction block by intra-predicting a target block by using the same intra prediction direction as a differential modulation direction.

In this case, the video encoding apparatus and the video decoding apparatus may perform intra prediction on a target block by using samples not filtered from edge samples of a neighbor block on the top or left of the target block with respect to the target block on which the differential modulation is applied. Using filtered samples may result in additional residual components in the low frequency region to a residual block, so that it is not suitable for a block where the differential modulation is applied and therefore coded in the transform skip mode.

As described above, in some embodiments, the size of a maximum transform unit in which a transform skip is permitted may be individually defined with respect to the width and the height. In other words, each of a maximum width (MaxTsSize_X) and maximum height (MaxTsSize_Y) of a transform unit for which a transform skip is permitted may be defined, and information thereon may be signaled in an SPS or a PPS. In such an embodiment, the differential modulation may be applied when a condition in which the width of a target block needs to be equal to or smaller than the maximum width (MaxTsSize_X) and the height of the target block needs to be equal to or smaller than the maximum height (MaxTsSize_Y) is satisfied. Accordingly, when the condition is satisfied, the video encoding apparatus encodes the first syntax element indicating whether to apply the differential modulation to the target block, and the video encoding apparatus encodes the second syntax element indicating a direction of the differential modulation depending on the first syntax element. When the condition is not satisfied, the video encoding apparatus does not apply the differential modulation to the target block. Accordingly, the first and second syntax elements are also not encoded. The video decoding apparatus extracts, from a bitstream, the first syntax element indicating whether to apply the differential modulation to the target block only when the condition is satisfied and extracts the second syntax element indicating a direction of the differential modulation depending on the first syntax element.

Various methods of controlling whether the differential modulation is permitted in a high level and various methods of controlling whether to apply the differential modulation in a block level when the differential modulation is permitted in a high level have been described above. Through combinations between the various control methods in the high level and the various control methods in the block level, the use of the differential modulation of a video sequence may be controlled. Hereinafter, one embodiment of various combinations is described.

Figure 6:
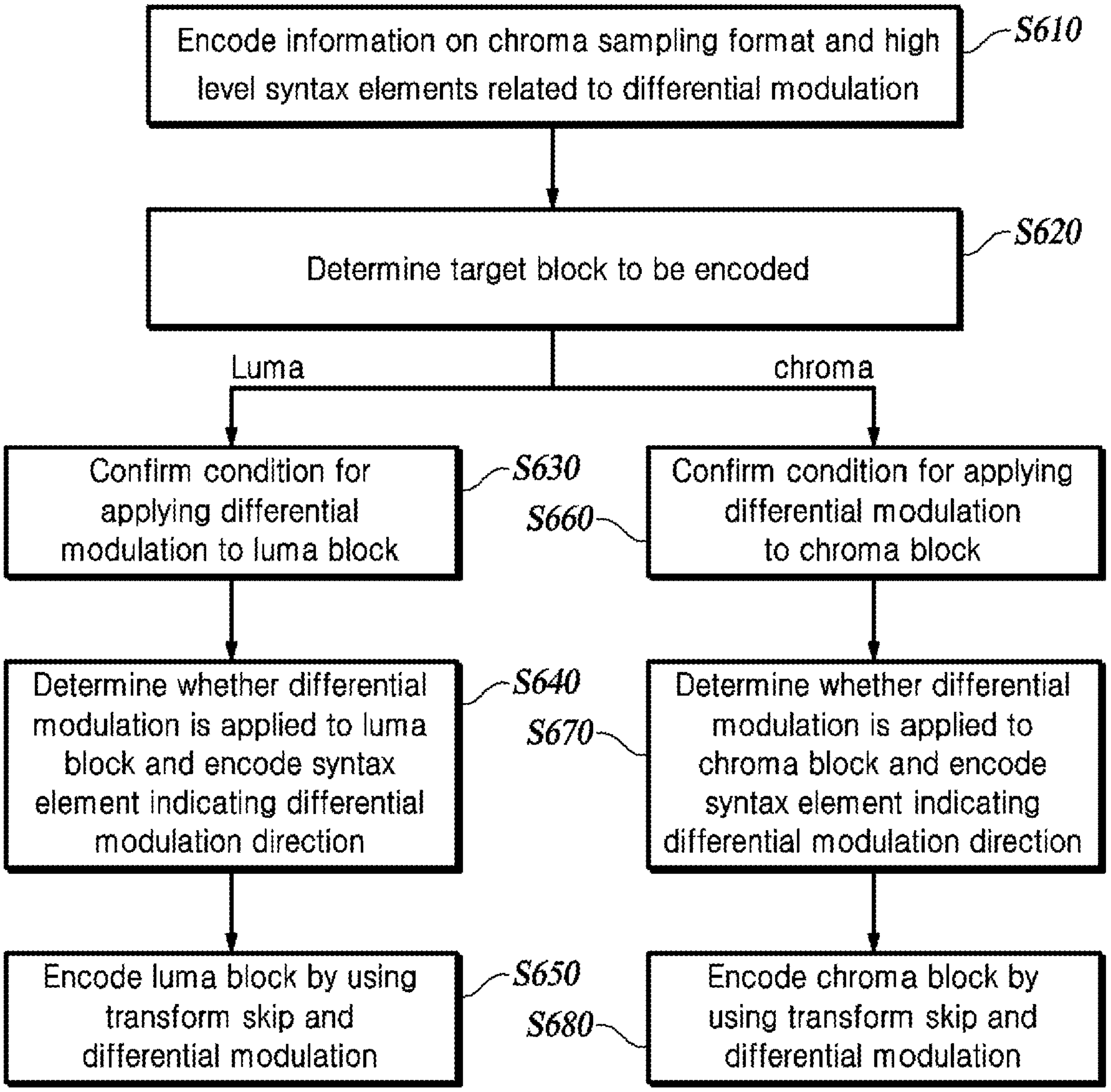
FIG. 6 is a flowchart for describing a method of encoding a video sequence by using the differential modulation technique according to an embodiment of the present disclosure.
Figure 7:
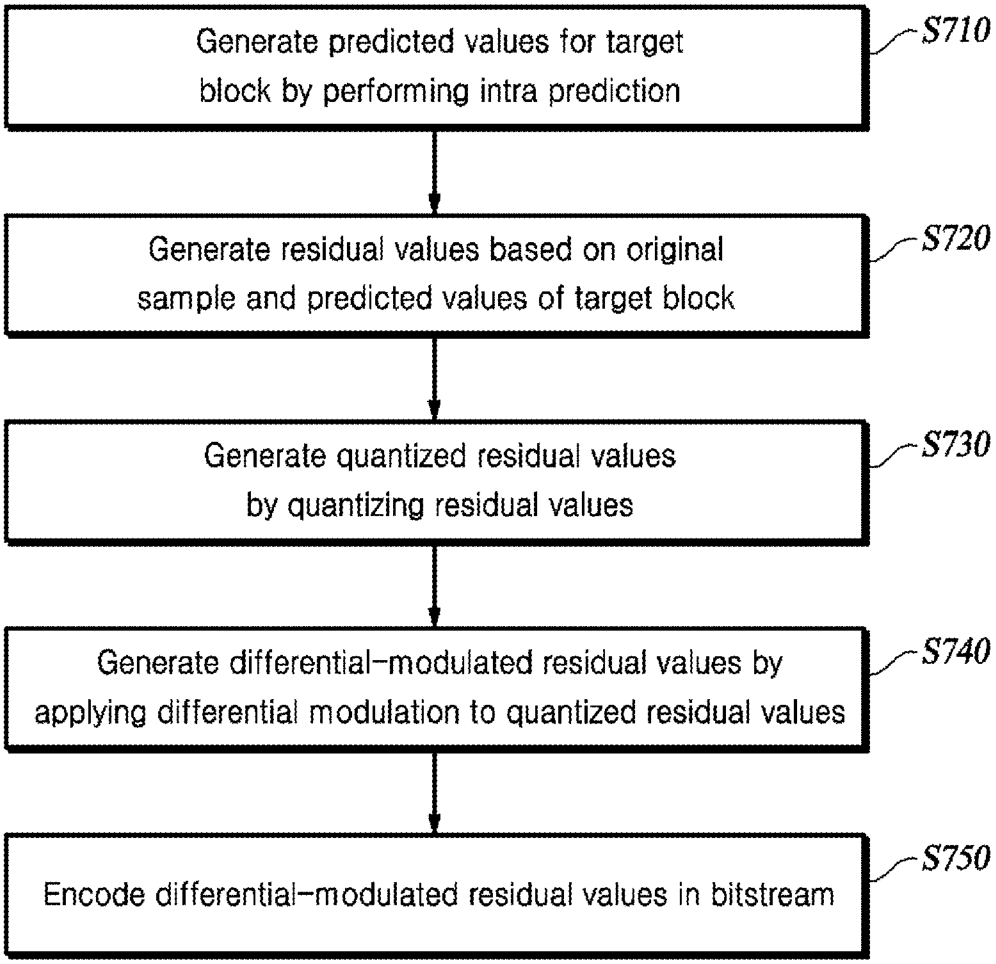
FIG. 7 is a flowchart for describing a method of encoding a block of a video using the differential modulation technique according to an embodiment of the present disclosure.

FIG. 6 is a flowchart for describing a method of encoding a video sequence by using the differential modulation technique according to an embodiment of the present disclosure. FIG. 7 is a flowchart for describing a method of encoding a block of a video using the differential modulation technique according to an embodiment of the present disclosure.

The video encoding apparatus encodes, in an SPS, information on a chroma sampling format and high level syntax elements related to the differential modulation for residual signals (S610). In this case, the high level syntax elements include a control flag indicating whether the differential modulation is permitted for the residual signals of a video sequence. In other words, the differential modulation for both a luma component and a chroma component is permitted or restricted by the control flag. Furthermore, the high level syntax elements include information on a maximum block size in which the differential modulation is permitted. The information on a maximum block size for which the differential modulation is permitted may be information on a maximum transform size (e.g., MaxTsSize) for which a transform skip is permitted or may be a block size (e.g., Max_Hor_Size, Max_Ver_Size) separately set for controlling the differential modulation.

When a target block to be currently encoded is determined (S620), an encoding process is performed on each of a luma block and a chroma block corresponding to the target block. In FIGS. 6, S630, S640, and S650 indicate an encoding process for the luma block including the use of the differential modulation technique, and S660, S670, and S680 indicate an encoding process for the chroma block including the use of the differential modulation technique.

The luma block is first described. The video encoding apparatus confirms a condition in which the differential modulation is applied to the luma block (S630). In this case, the condition for the luma block is defined by the high level syntax elements. As described above, the differential modulation for the luma block may be applied when the following conditions are satisfied.

(1) The control flag needs to indicate that the differential modulation is permitted for both a luma component and a chroma component.

(2) The width of the target block corresponding to the luma block needs to be smaller than or equal to a maximum block size.

(3) The height of the target block corresponding to the luma block needs to be smaller than or equal to a maximum block size.

When the conditions are satisfied, the video encoding apparatus encodes a first syntax element indicating whether the differential modulation is applied to the luma block. Furthermore, when the first syntax element indicates that the differential modulation is applied, the video encoding apparatus encodes a second syntax element indicating a differential modulation direction of the luma block (S640).

If the differential modulation is applied to the luma block, the video encoding apparatus encodes the luma block by performing an encoding process using a transform skip and the differential modulation (S650). The differential modulation technique may be applied to only an intra-prediction-coded block and may not be applied to an inter-prediction-coded block. Accordingly, the video encoding apparatus may apply the transform skip and the differential modulation technique in encoding the residual block of an intra-coded luma block.

Specifically, referring to FIG. 7, the video encoding apparatus sets, as an intra prediction mode for the luma block, a directional intra prediction mode having the same direction as a differential modulation direction indicated by the second syntax element and generates a prediction block for the luma block by using the intra prediction mode (S710). In this case, the video encoding apparatus may perform intra prediction on the luma block to which the differential modulation is applied by using samples not filtered from edge samples of a neighboring luma block on the top or left of the luma block.

Furthermore, the video encoding apparatus generates residual values for the luma block by subtracting predicted values of a prediction block from original sample values of the luma block (S720) and quantizes the residual values (S730). As the differential modulation is a tool which is permitted in the transform skip mode, a transform for a block (i.e., the residual block) of the residual values is not performed.

As described with reference to Equations 1 and 2, the video encoding apparatus performs the differential modulation on the residual signals within the quantized residual block in a differential modulation direction indicated by the second syntax element (S740). The video encoding apparatus entropy encodes the differential-modulated residual values for the luma block in a bitstream (S750).

Meanwhile, referring to S660, S670, and S680 in FIG. 6, the video encoding apparatus performs a process similar to that of the luma block on a chroma block corresponding to the target block. However, a condition for applying the differential modulation is different from the luma block. In S660, the condition for applying the differential modulation to the chroma block is defined based on chroma format information in addition to a high level syntax element and is as follows.

(1) The control flag needs to indicate that the differential modulation is permitted for a video sequence.

(2) A value obtained by dividing the width of a target block corresponding to a chroma block by a width scaling factor determined by a chroma sampling format needs to be smaller than or equal to a maximum block size.

(3) A value obtained by dividing the height of a target block corresponding to a chroma block by a height scaling factor determined based on a chroma sampling format needs to be smaller than or equal to a maximum block size.

When the conditions are satisfied, as follows, a process (S670 and S680) substantially identical with the process performed in S630, S640, and S650 is performed.

The video encoding apparatus encodes the first syntax element indicating whether the differential modulation is applied to the chroma block. Furthermore, when the first syntax element indicates that the differential modulation is applied, the video encoding apparatus encodes the second syntax element indicating a differential modulation direction of the chroma block (S670).

If the differential modulation is applied, the video encoding apparatus encodes the chroma block by performing an encoding process using a transform skip and the differential modulation (S680). The video encoding apparatus encodes a residual block by using a transform skip and the differential modulation technique in encoding the residual block of an intra-coded chroma block.

Referring back FIG. 7, if the differential modulation is applied to the chroma block, the video encoding apparatus sets, as an intra prediction mode for the chroma block, a directional intra prediction mode having the same direction as a differential modulation direction indicated by a second syntax element and generates a prediction block for the chroma block by using the set intra prediction mode (S710). In this case, the video encoding apparatus may perform intra prediction on the chroma block by using samples not filtered from edge samples of a neighboring chroma block on the top or left of the chroma block.

Furthermore, the video encoding apparatus generates residual values for the chroma block by subtracting predicted values of the prediction block from original sample values of the chroma block (S720) and quantizes the residual values (S730). As the differential modulation is a tool, which is permitted in the transform skip mode, a transform for a block (i.e., the residual block) of the residual values is not performed.

As described with reference to Equations 1 and 2, the video encoding apparatus performs the differential modulation on the residual signals within the quantized residual block in the differential modulation direction indicated by the second syntax element (S740). The video encoding apparatus entropy-encodes the differential-modulated residual values for the chroma block in the bitstream (S750).

Figure 8:
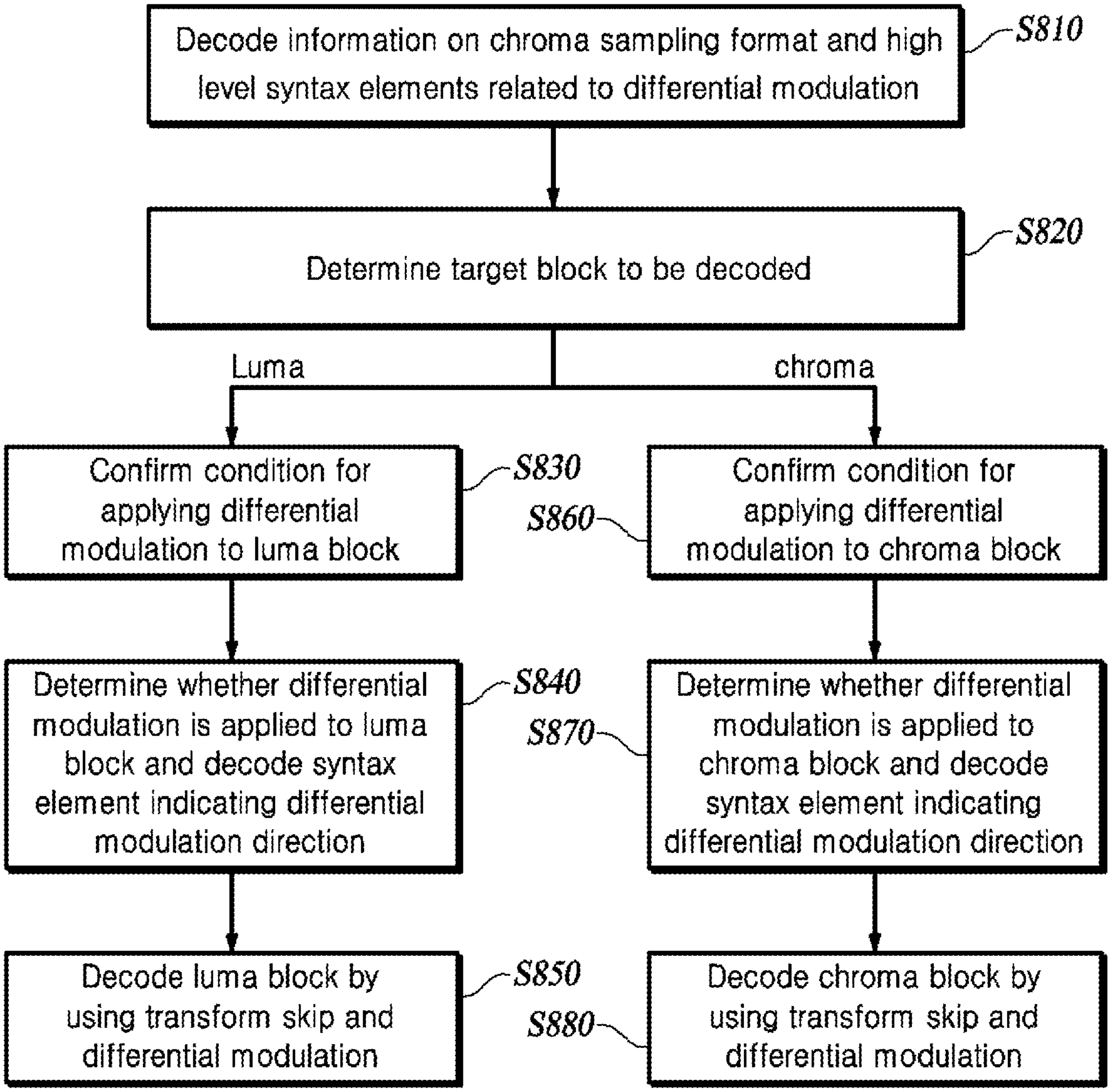
FIG. 8 is a flowchart for describing a method of decoding a video sequence by using the differential modulation technique according to an embodiment of the present disclosure.
Figure 9:
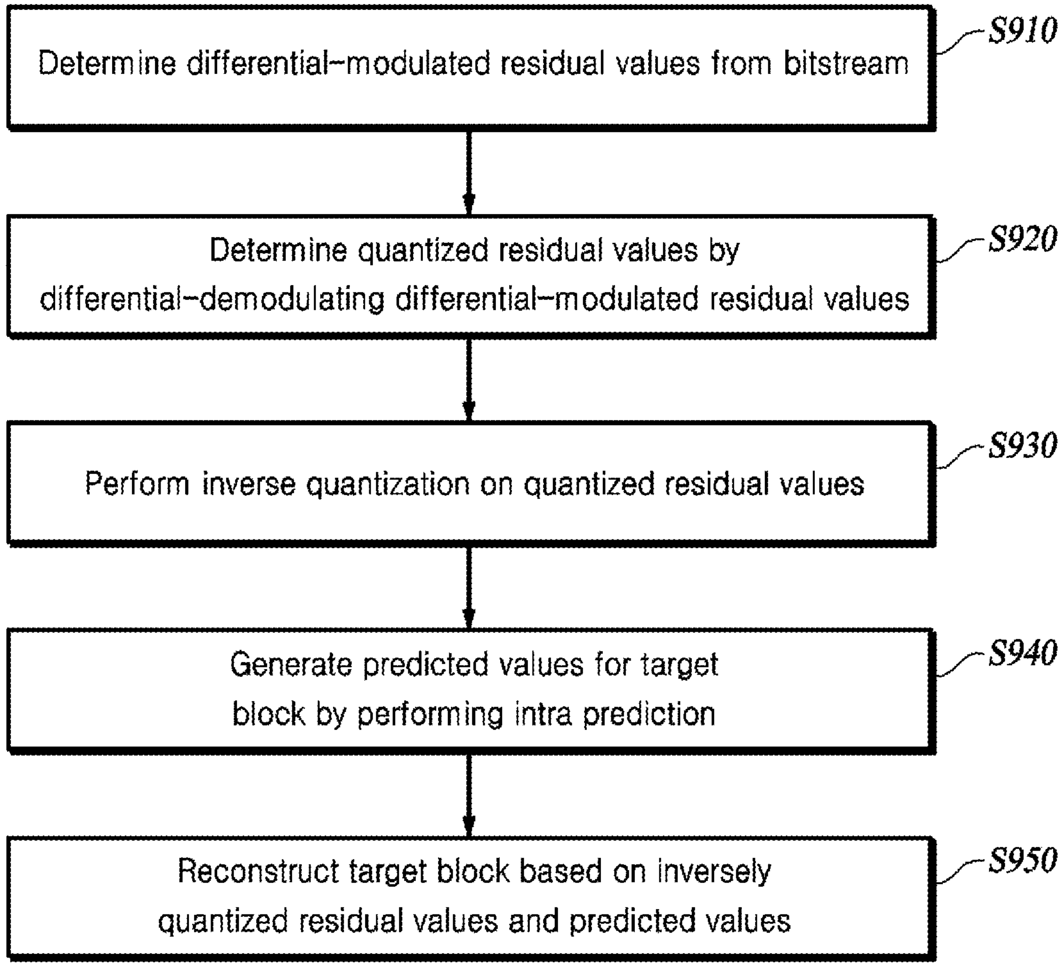
FIG. 9 is a flowchart for describing a method of decoding a block of a video using the differential modulation technique according to an embodiment of the present disclosure.

FIG. 8 is a flowchart for describing a method of decoding a video sequence by using the differential modulation technique according to an embodiment of the present disclosure. FIG. 9 is a flowchart for describing a method of decoding a block of a video using the differential modulation technique according to an embodiment of the present disclosure.

The video decoding apparatus decodes information on a chroma sampling format and high level syntax elements related to the differential modulation for residual signals from an SPS within a bitstream received from the video encoding apparatus (S810).

When a target block to be decoded is determined (S820), a decoding process is performed on each of a luma block and a chroma block corresponding to the target block. In FIGS.

8, S830, S840, and S850 indicate a decoding process for a luma block including the use of the differential modulation technique, and S860, S870, and S880 indicate a decoding process for a chroma block including the use of the differential modulation technique.

The luma block is first described. The video decoding apparatus confirms whether a condition in which the application of the differential modulation to the luma block is permitted is satisfied (S830). In this case, the condition for the luma block is defined by high level syntax elements and is the same as the condition described in S630 of FIG. 6.

When the condition is satisfied, the video decoding apparatus decodes, from the bitstream, a first syntax element indicating whether the differential modulation is applied to the luma block. Furthermore, when the first syntax element indicates that the differential modulation is applied, the video decoding apparatus decodes a second syntax element indicating a differential modulation direction of the luma block (S840).

If the differential modulation has been applied to the luma block, the video decoding apparatus decodes the luma block by performing a decoding process using a transform skip and the differential modulation (S850). The differential modulation technique may be applied to only an intra-prediction-coded block and may not be applied to an inter-prediction-coded block. Accordingly, the video decoding apparatus applies the transform skip and the differential modulation technique in decoding a residual block of an intra-coded luma block.

Specifically, referring to FIG. 9, the video decoding apparatus determines a differential-modulated residual block for a luma block by reconstructing differential-modulated residual samples for the luma block from a bitstream (S910). Furthermore, the video decoding apparatus determines quantized residual values by performing the differential demodulation on the differential-modulated residual block in a differential modulation direction indicated by a second syntax element (S920). In other words, as already described with reference to Equations 3 and 4, the video decoding apparatus modifies residual signals within the differential-modulated residual block. Furthermore, the video decoding apparatus performs inverse quantization on the residual signals within the modified residual block (S930). The differential modulation is applied in the transform skip mode, and thus an inverse transform after the inverse quantization is skipped.

Furthermore, the video decoding apparatus generates a prediction block by performing intra prediction on the luma block (S940). To this end, the video decoding apparatus sets, as an intra prediction mode for the luma block, a directional intra prediction mode having the same direction as a differential modulation direction indicated by the second syntax element. Accordingly, information on the intra prediction mode for the luma block is not decoded. In this case, the video decoding apparatus may perform intra prediction on the luma block to the differential modulation is applied by using samples not filtered from edge samples of the neighboring luma block on the top or left of the luma block. Step S940 may be performed before S910, S920, and S930 and may be performed after any one step of S910, S920, and S930 or in parallel to S910, S920, and S930.

Finally, the video decoding apparatus reconstructs the luma block by adding the inversely quantized residual block to the prediction block generated through the intra prediction (S950).

Meanwhile, referring to S860, S870, and S880 of FIG. 8, the video decoding apparatus performs a process similar to that of the luma block on a chroma block corresponding to a target block. However, a condition for applying the differential modulation to the chroma block is different from that for the luma block. In other words, in S860, the condition for applying the differential modulation to the chroma block is defined based on chroma format information in addition to a high level syntax element and is the same as the condition described in S660 of FIG. 6.

Referring back to FIG. 9, the video decoding apparatus determines a differential-modulated residual block for a chroma block by reconstructing differential-modulated residual samples for the chroma block from a bitstream (S910). Furthermore, the video decoding apparatus determines quantized residual values by performing the differential demodulation on the differential-modulated residual block in a differential modulation direction indicated by a second syntax element (S920). In other words, as already described with reference to Equation 3 and 4, the video decoding apparatus modifies residual signals within the differential-modulated residual block. Furthermore, the video decoding apparatus performs inverse quantization on the residual signals within the modified residual block (S930). The differential modulation is applied in the transform skip mode, and thus an inverse transform after the inverse quantization is skipped.

Furthermore, the video decoding apparatus generates a prediction block by performing intra prediction on the chroma block (S940). To this end, the video decoding apparatus sets, as an intra prediction mode for the chroma block, a directional intra prediction mode having the same direction as the differential modulation direction indicated by the second syntax element. Accordingly, information on the intra prediction mode for the chroma block is not decoded. In this case, the video decoding apparatus may perform intra prediction on the chroma block to which the differential modulation is applied by using samples not filtered from edge samples of the neighboring chroma block on the top or left of the chroma block.

Finally, the video decoding apparatus reconstructs the chroma block by adding the inversely quantized residual block to the prediction block generated through the intra prediction (S950).

It should be understood that the above-described embodiments can be implemented in many different ways. The functions described in one or more examples may be implemented in hardware, software, firmware, or any combination of the above. The functional components described in this specification have been labeled as units in order to more particularly emphasize their potential independent implementation.

Meanwhile, various methods or functions described in the present disclosure may be implemented with instructions stored in a non-transitory recording medium, which may be read and executed by one or more processors. The non-transitory recording medium includes, for example, all types of recording devices in which data is stored in a form readable by a computer system. For example, the non-transitory recording medium includes storage media such as an erasable and programmable read only memory (EPROM), an electrically erasable and programmable read-only memory (EEPROM), a flash drive, an optical drive, a magnetic hard drive, and a solid state drive (SSD).

Although embodiments have been described for illustrative purposes, those having ordinary skill in the art should appreciate that and various modifications and changes are possible, without departing from the idea and scope of the embodiments. Embodiments have been described for the sake of brevity and clarity. Accordingly, one of ordinary skill should understand that the scope of the embodiments is not limited by the embodiments explicitly described above but is inclusive of the claims and equivalents thereto.

What is claimed is:

1. A method for decoding a bitstream encoded from a video sequence comprising a plurality of pictures, the method comprising:

decoding, from a sequence parameter set of the bitstream, information on a chroma sampling format and high level syntax elements related to differential modulation for residual signals, wherein the information on the chroma sampling format indicates one of a plurality of chroma sampling formats including 4:4:4, 4:2:2, or 4:2:0, and wherein the high level syntax elements comprise a single common control flag indicating whether the differential modulation is permitted for the residual signals of each of luma and chroma components of the video sequence and information on a maximum block size for which the differential modulation is permitted;

decoding a first chroma syntax element indicating whether the differential modulation has been applied to a chroma block corresponding to a first block to be currently decoded, when the first block satisfies conditions defined by the information on the chroma sampling format and the high level syntax elements;

decoding a second chroma syntax element indicating a differential modulation direction applied to the chroma block among a plurality of differential modulation directions including a horizontal direction and a vertical direction, in response to the first chroma syntax element indicating that the differential modulation has been applied to the chroma block;

determining a differential-modulated residual block for the chroma block from the bitstream;

determining quantized residual values by differential-demodulating the differential-modulated residual block in the differential modulation direction indicated by the second chroma syntax element;

inversely quantizing the quantized residual values for the chroma block;

generating predicted values for the chroma block; and reconstructing the chroma block corresponding to the first block based on the inversely quantized residual values and the predicted values, wherein the conditions defined by the information on the chroma sampling format and the high level syntax elements are satisfied when:

(1) the single common control flag indicates that the differential modulation is permitted for the video sequence, (2) a value obtained by dividing a width of the first block by a horizontal scaling factor determined by the chroma sampling format that the information on the chroma sampling format indicates among the plurality of chroma sampling formats is smaller than or equal to the maximum block size, and (3) a value obtained by dividing a height of the first block by a vertical scaling factor determined by the chroma sampling format indicated by the information on the chroma sampling format is smaller than or equal to the maximum block size.

2. The method of claim 1, wherein generating the predicted values for the chroma block comprises:

setting, as an intra prediction mode for the chroma block, a prediction mode having a direction identical with the differential modulation direction indicated by the second chroma syntax element among a vertical prediction mode and a horizontal prediction mode; and generating the predicted values for the chroma block based on the intra prediction mode for the chroma block.

3. The method of claim 1, wherein generating the prediction values for the chroma block comprises:

generating the prediction values for the chroma block by performing intra prediction on the chroma block by using samples not filtered from edge samples of a top or left block of the chroma block.

4. The method of claim 1, wherein determining the quantized residual values comprises:

determining, as in an equation below, the quantized residual values when the second chroma syntax element indicates that the differential modulation direction is horizontal, $$Q(r_{i,j}) = \sum_{k=0}^{j} \tilde{r}_{i,k},\ 0 \le i \le (M-1),\ 0 \le j \le (N-1)$$

wherein, $Q(r_{i,j})$ is a quantized residual value at a position [i, j] within the chroma block, $\tilde{r}_{i,k}$ is a sample value at a position [i, k] within the differential-modulated residual block, M is the number of rows of the chroma block, and N is the number of columns of the chroma block.

5. The method of claim 1, wherein determining the quantized residual values comprises, determining, as in an equation below, the quantized residual values when the second chroma syntax element indicates that the differential modulation direction is vertical, $$Q(r_{i,j}) = \sum_{k=0}^{i} \tilde{r}_{k,j},\ 0 \le i \le (M-1),\ 0 \le j \le (N-1)$$

wherein, $Q(r_{i,j})$ is a quantized residual value at a position [i, j] within the chroma block, $\tilde{r}_{k,j}$ is a sample value at a position [k, j] within the differential-modulated residual block, M is the number of rows of the chroma block, and N is the number of columns of the chroma block.

6. The method of claim 1, wherein the information on the maximum block size for which the differential modulation is permitted is information on a maximum transform size for which a transform skip is permitted.

7. The method of claim 1, further comprising:

decoding a first luma syntax element indicating whether the differential modulation has been applied to a luma block corresponding to the first block, when the first block satisfies the condition defined by the high level syntax elements;

decoding a second luma syntax element indicating a differential modulation direction applied to the luma block, in response to the first luma syntax element indicating that the differential modulation has been applied to the luma block;

determining a differential-modulated residual block for the luma block from the bitstream;

determining quantized residual values by differential-demodulating the differential-modulated residual block for the luma block in a differential modulation direction indicated by the second luma syntax element;

inversely quantizing the quantized residual values for the luma block;

generating predicted values for the luma block; and reconstructing the luma block corresponding to the first block based on the inversely quantized residual values and the predicted values.

8. The method of claim 7, wherein the condition defined by the high level syntax elements is satisfied when the single common control flag indicates that the differential modulation is permitted for the video sequence, a width of the first block is smaller than or equal to the maximum block size, and a height of the first block is smaller than or equal to the maximum block size.

9. The method of claim 7, wherein in determining an MPM list for a luma block corresponding to a second block neighboring the luma block corresponding to the first block, an intra prediction mode of the luma block corresponding to the first block is set as a prediction mode having a direction identical with the differential modulation direction indicated by the second luma syntax element among a vertical prediction mode and a horizontal prediction mode.

10. A method for encoding a video sequence comprising a plurality of pictures, the method comprising:

encoding, in a sequence parameter set of a bitstream, information on a chroma sampling format and high level syntax elements related to differential modulation for residual signals, wherein the information on the chroma sampling format indicates one of a plurality of chroma sampling formats including 4:4:4, 4:2:2, or 4:2:0, and wherein the high level syntax elements comprise a single common control flag indicating whether the differential modulation is permitted for the residual signals of each of luma and chroma components of the video sequence and information on a maximum block size for which the differential modulation is permitted;

encoding a first chroma syntax element indicating whether the differential modulation has been applied to a chroma block corresponding to a first block, when the first block to be currently decoded satisfies conditions defined by the information on the chroma sampling format and the high level syntax elements;

encoding a second chroma syntax element indicating a differential modulation direction applied to the chroma block among a plurality of differential modulation directions including a horizontal direction and a vertical direction, in response to the first chroma syntax element indicating that the differential modulation has been applied to the chroma block;

generating predicted values for the chroma block;

determining a residual block for the chroma block based on the predicted values of the chroma block;

generating quantized residual values by quantizing the residual block for the chroma block;

determining differential-modulated residual values by differential-modulating the quantized residual values in the differential modulation direction indicated by the second chroma syntax element; and encoding the differential-modulated residual values in the bitstream, wherein the conditions defined by the information on the chroma sampling format and the high level syntax elements are satisfied when:

(1) the single common control flag indicates that the differential modulation is permitted for the video sequence, (2) a value obtained by dividing a width of the first block by a horizontal scaling factor determined by the chroma sampling format that the information on the chroma sampling format indicates among the plurality of chroma sampling formats is smaller than or equal to the maximum block size, and (3) a value obtained by dividing a height of the first block by a vertical scaling factor determined by the chroma sampling format indicated by the information on the chroma sampling format is smaller than or equal to the maximum block size.

11. A method for providing a video decoding apparatus with a video data, the method comprising:

encoding a video data into a bitstream; and transmitting the bitstream to the video decoding apparatus, wherein the encoding of the video data includes:

encoding, in a sequence parameter set of the bitstream, information on a chroma sampling format and high level syntax elements related to differential modulation for residual signals, wherein the information on the chroma sampling format indicates one of a plurality of chroma sampling formats including 4:4:4, 4:2:2, or 4:2:0, and wherein the high level syntax elements comprise a single common control flag indicating whether the differential modulation is permitted for the residual signals of each of luma and chroma components of the video sequence and information on a maximum block size for which the differential modulation is permitted;

encoding a first chroma syntax element indicating whether the differential modulation has been applied to a chroma block corresponding to a first block, when the first block to be currently decoded satisfies conditions defined by the information on the chroma sampling format and the high level syntax elements;

encoding a second chroma syntax element indicating a differential modulation direction applied to the chroma block among a plurality of differential modulation directions including a horizontal direction and a vertical direction, in response to the first chroma syntax element indicating that the differential modulation has been applied to the chroma block;

generating predicted values for the chroma block;

determining a residual block for the chroma block based on the predicted values of the chroma block;

generating quantized residual values by quantizing the residual block for the chroma block;

determining differential-modulated residual values by differential-modulating the quantized residual values in the differential modulation direction indicated by the second chroma syntax element; and encoding the differential-modulated residual values in the bitstream, wherein the conditions defined by the information on the chroma sampling format and the high level syntax elements are satisfied when:

(1) the single common control flag indicates that the differential modulation is permitted for the video sequence, (2) a value obtained by dividing a width of the first block by a horizontal scaling factor determined by the chroma sampling format that the information on the chroma sampling format indicates among the plurality of chroma sampling formats is smaller than or equal to the maximum block size, and (3) a value obtained by dividing a height of the first block by a vertical scaling factor determined by the chroma sampling format indicated by the information on the chroma sampling format is smaller than or equal to the maximum block size.

* * * * *